US012088973B2

(12) United States Patent
Li et al.

(10) Patent No.: US 12,088,973 B2
(45) Date of Patent: Sep. 10, 2024

(54) WAVELENGTH SELECTIVE SWITCH WSS

(71) Applicant: HUAWEI TECHNOLOGIES CO., LTD., Guangdong (CN)

(72) Inventors: Tenghao Li, Shenzhen (CN); Yong Wang, Shanghai (CN); Hui Xiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 56 days.

(21) Appl. No.: 17/870,014

(22) Filed: Jul. 21, 2022

(65) Prior Publication Data
US 2022/0360870 A1    Nov. 10, 2022

Related U.S. Application Data

(63) Continuation of application No. PCT/CN2021/072594, filed on Jan. 19, 2021.

(30) Foreign Application Priority Data

Jan. 23, 2020  (CN) .......................... 202010076993.6
Dec. 1, 2020   (CN) .......................... 202011384466.8

(51) Int. Cl.
*H04Q 11/00* (2006.01)
*G02F 1/1362* (2006.01)
(Continued)

(52) U.S. Cl.
CPC ... *H04Q 11/0005* (2013.01); *G02F 1/136277* (2013.01); *G02F 1/31* (2013.01);
(Continued)

(58) Field of Classification Search
None
See application file for complete search history.

(56) References Cited

U.S. PATENT DOCUMENTS

2003/0043471 A1*  3/2003  Belser ................. H04J 14/0208
                                                          359/634
2006/0222290 A1* 10/2006  Yamashita ........... G02B 6/3586
                                                          385/18
(Continued)

FOREIGN PATENT DOCUMENTS

AU    2014235953 B2    11/2017
CN       1952736 A      4/2007
(Continued)

OTHER PUBLICATIONS

Shen et al., "Optimizing the diffraction efficiency of LCOS-based holography with anomalous reflection by gradient meta-surface," Three-Dimensional Imaging, Visualization, and Display 2015, vol. 9495, May 22, 2015, 7 pages.

(Continued)

*Primary Examiner* — Darren E Wolf
(74) *Attorney, Agent, or Firm* — Fish & Richardson P.C.

(57)    ABSTRACT

The present disclosure provides example wavelength selective switch (WSS), wavefront control element, and integrated liquid crystal on silicon (LCoS). One example WSS includes an input port fiber array, a demultiplexing/multiplexing grating group, an output port fiber array, and a beam deflection component group including two beam deflection components and at least one wavefront control element located between the demultiplexing/multiplexing grating group and the beam deflection component group or integrated with the LCoS. At least one beam deflection component is a LCoS. The input port fiber array receives multi-wavelength optical signals. The demultiplexing/multiplexing grating group demultiplexes and outputs the multi-wavelength optical signals. The beam deflection component group deflects the multi-wavelength optical signals to the demultiplexing/multiplexing grating group. The demultiplexing/multiplexing grating group multiplexes the (Continued)

multi-wavelength optical signals to the output port fiber array. The wavefront control element and the LCoS jointly modulate optical signals transmitted through N*M wavelength channels.

16 Claims, 15 Drawing Sheets

(51) Int. Cl.
  *G02F 1/31* (2006.01)
  *H04J 14/02* (2006.01)
(52) U.S. Cl.
  CPC .. *H04J 14/0212* (2013.01); *H04Q 2011/0016* (2013.01); *H04Q 2011/0026* (2013.01); *H04Q 2011/0035* (2013.01)

(56) References Cited

U.S. PATENT DOCUMENTS

| | | | |
|---|---|---|---|
| 2007/0085972 A1 | 4/2007 | Tan et al. | |
| 2010/0221002 A1* | 9/2010 | Ooi | G02B 6/2931 398/48 |
| 2013/0272650 A1 | 10/2013 | Ishikawa et al. | |
| 2014/0285867 A1 | 9/2014 | Wagener | |
| 2016/0291405 A1 | 10/2016 | Frisken et al. | |
| 2018/0288504 A1 | 10/2018 | Yang et al. | |
| 2019/0196267 A1 | 6/2019 | Yoo et al. | |

FOREIGN PATENT DOCUMENTS

| | | |
|---|---|---|
| CN | 102608710 A | 7/2012 |
| CN | 104049305 A | 9/2014 |
| CN | 104603671 A | 5/2015 |
| CN | 105739026 A | 7/2016 |
| WO | 2014153455 A1 | 9/2014 |

OTHER PUBLICATIONS

Lazarev et al., "Beyond the display: phase-only liquid crystal on Silicon devices and their applications in photonics [Invited]," Optics Express, vol. 27, No. 11, May 27, 2019, 44 pages.

Extended European Search Report in European Appln No. 21743670.8, dated May 12, 2023, 12 pages.

Xu et al., "Wide-Angular-Range and High-Resolution Beam Steering by a Metasurface-Coupled Phased Array," Optics Letters, vol. 43, No. 21, Nov. 1, 2018, 4 pages.

International Search Report and Written Opinion in International Appln. No. PCT/CN2021/072594, mailed on Apr. 19, 2021, 19 pages (with English translation).

* cited by examiner

WAVELENGTH SELECTIVE SWITCH WSS

CROSS-REFERENCE TO RELATED APPLICATIONS

This application is a continuation of International Application No. PCT/CN2021/072594, filed on Jan. 19, 2021, which claims priority to Chinese Patent Application No. 202010076993.6, filed on Jan. 13, 2020 and Chinese Patent Application No. 202011384466.8, filed on Dec. 1, 2020. All of the aforementioned patent applications are hereby incorporated by reference in their entireties.

TECHNICAL FIELD

This application relates to the field of optical communication, and in particular, to a wavelength selective switch (WSS).

BACKGROUND

Optical networks are continuously evolving towards large capacity, low latency, and intelligence. Optical switching technologies such as a reconfigurable optical add/drop multiplexer (ROADM) and an optical cross-connect (OXC) not only support current commercial optical networks, but also are key technologies for implementing next-generation optical networks. A wavelength selective switch (WSS) is a core component of the OXC, and port/channel expansion of the WSS has an urgent need and practical value.

A conventional WSS uses a phase-type liquid crystal on silicon (LcoS) as its core switching engine, to implement optical path switching. The LCoS is a reflective diffraction grating programmable to realize a specific phase distribution, whose main function is to deflect an incident beam to a corresponding emergent direction. FIG. 1A and FIG. 1B are schematic diagrams of a principle of a WSS. The apparatus is an N×N WSS, that is, the WSS has N input ports and N output ports, to implement all-optical connection in any pairing between the input ports and the output ports. FIG. 1A is a main view of the WSS. FIG. 1B is a corresponding top view of the WSS. Main components of the apparatus include an input port fiber array 101, an output port fiber array 106, demultiplexing/multiplexing gratings 102 and 105, a first-stage LCoS 103, and a second-stage LCoS 104. The LCoSs are reflective components. To visually express a beam deflection angle relationship between the first-stage LCoS 103 and the second-stage LCoS 104 (deflection angles are equal), a refraction diagram in FIG. 1A is used for illustration. For different input ports, the first-stage LCoS 103 may independently deflect corresponding beams. For different output ports, the second-stage LCoS 104 may independently deflect corresponding beams With development of optical networks, a port quantity of the WSS is greatly expanded. Due to limitations of a structure size and an optical path design of the WSS and the port quantity expansion of the WSS, a maximum beam deflection angle required for optical path switching of the WSS is correspondingly increased. If the same LCoS switching engine is used, to increase the maximum beam deflection angle, diffraction efficiency and isolation of deflected beams are inevitably decreased, which increases crosstalk of the WSS.

SUMMARY

Embodiments of this application provide a wavelength selective switch WSS, to suppress diffraction sub-peaks of deflected beams and improve isolation, thereby greatly reducing crosstalk of the WSS.

According to a first aspect, an embodiment of this application provides a wavelength selective switch WSS, which specifically includes: an input port fiber array, a demultiplexing/multiplexing grating group, an output port fiber array, and a beam deflection component group. The beam deflection component group includes two beam deflection components and at least one wavefront control element, and at least one beam deflection component is a liquid crystal on silicon LCoS. The wavefront control element is located on an optical path between the demultiplexing/multiplexing grating group and the beam deflection component group, or the wavefront control element and the LCoS are integrated into an integrated LCoS. The input port fiber array includes N ports, and the ports receive multi-wavelength optical signals. The demultiplexing/multiplexing grating group demultiplexes the multi-wavelength optical signals received from the N ports to N*M wavelength channels for transmission. Both N and M are positive integers. The beam deflection component group deflects, to the demultiplexing/multiplexing grating group, the optical signals transmitted through the N*M wavelength channels. The demultiplexing/multiplexing grating group multiplexes, to the output port fiber array, the optical signals transmitted through the N*M wavelength channels. The wavefront control element and the LCoS jointly modulate the optical signals transmitted through the N*M wavelength channels, so that the WSS suppresses diffraction sub-peaks generated when the optical signals transmitted through the N*M wavelength channels pass through the LCoS.

In the technical solution provided in this embodiment of this application, the wavefront control element is added to the beam deflection component group of the WSS, so that the wavefront control element and the original LCoS jointly modulate the optical signals transmitted through the N ports and the M wavelength channels. In this way, the WSS suppresses the diffraction sub-peaks of the optical signals transmitted through the M wavelength channels, thereby improving isolation and greatly reducing crosstalk of the WSS. In addition, the modulation performed by the wavefront control element on the optical signals transmitted through the N*M wavelength channels matches the deflection performed by the LCoS on the optical signals transmitted through the N*M wavelength channels (that is, after the wavefront control element and the LCoS jointly modulate the optical signals, crosstalk of polarized light is reduced), to reduce crosstalk of polarized light.

Optionally, a specific structure of the wavefront control element may be as follows: The wavefront control element includes N*M array elements. N represents rows, configured to correspond to the N ports, and array elements in a same row are configured to correspond to different wavelength channels of a same port, M represents columns, configured to correspond to the M wavelength channels, and array elements in a same column are configured to correspond to different ports of a same wavelength channel. Wavefront control introduced by each of the N*M array elements is determined based on a phase image formed by each spot unit and deflection angle of the LCoS. Each of the N*M array elements modulates a corresponding optical signal in the N*M optical signals received by the input port fiber array, so that the WSS suppresses a diffraction sub-peak generated when the corresponding optical signal passes through the LCoS. Array elements in a same column of the N*M array elements have a same structure. It may be understood that, structures of array elements in different columns of the N*M array elements are determined based on center wavelengths of optical signals corresponding to the array elements and a channel bandwidth. In this embodiment, the wavefront control includes intensity and phase control, which is specifically determined based on a requirement of the WSS.

In this embodiment of this application, the wavefront control element and the LCoS may exist independently, or may be integrated into a whole, so that structural diversity of the WSS can be implemented, which is applicable to different scenarios. In this embodiment of this application, the two cases are separately described as follows:

In an example solution, the wavefront control element and the LCoS are independent physical apparatuses. In this case, optionally, the wavefront control element may be a diffractive optical element or a super-surface optical element. In this embodiment, the wavefront control element may alternatively be a surface plasma optical element or a diffraction grating. Specific details are not limited herein, provided that the following function can be implemented: the wavefront control element and the LCoS jointly modulate the optical signals transmitted through the N*M wavelength channels, so that the WSS suppresses the diffraction sub-peaks generated when the optical signals transmitted through the M wavelength channels pass through the LCoS.

Based on the foregoing solution, different cases of the wavefront control element are described as follows:

In an example solution, the wavefront control element is a super-surface optical element. In this case, the array element of the super-surface optical element includes a plurality of nanopillars, a width of the nanopillar is less than or equal to a wavelength of the multi-wavelength optical signal, and a height of the nanopillar is less than or equal to the wavelength of the multi-wavelength optical signal. The plurality of nanopillars are grouped and arranged in columns. In addition, in this embodiment, a length of each column of nanopillars (that is, a length of all nanopillar arrangement in each column) is equal to a length of the array element (that is, a length of an edge of the array element in a column direction). A width occupied by each column of nanopillars is d, and arrangement positions of nanopillars between adjacent columns are the same. In this embodiment, a material of the nanopillar may be any one of Si, SiN, ITO, solid metal, and SiO2, and a material of the array element may be any combination of Si, SiN, ITO, solid metal, and SiO2, that is, the array element may be made of a single material, or may be made of a plurality of materials, which is not specifically limited herein. In this embodiment, the nano is defined as that a size of the nanopillar is in a nanometer scale, and the definition is also true for nano mentioned elsewhere in this embodiment of this application. In addition, a shape of the nanopillar may be a cylinder, or may be another possible shape, such as a square pillar. A specific shape is not limited herein, provided that a function of the array element can be implemented.

in the array element of the super-surface optical element, each column of nanopillars is arranged based on an arrangement period. The arrangement period is determined based on LCoS diffraction grating periods corresponding to a preset deflection angle set in the WSS (it may be understood that the arrangement period may be equal to an average value of the LCoS diffraction grating periods corresponding to the preset deflection angle se in the WSS, or may be any value of the LCoS diffraction grating periods corresponding to the preset deflection angle set in the WSS). The preset deflection angle set includes a maximum deflection angle of the WSS and at least one of deflection angles within a preset range from the maximum deflection angle. For example, if the maximum deflection angle of the WSS is 10 degrees, the preset deflection angle set may include 10 degrees, 9 degrees, and 8 degrees. In the foregoing arrangement manner, an arrangement distance between adjacent nanopillars in one column of nanopillars may be implemented in the following several possible manners: In a possible implementation, the arrangement distance meets that a regulated phase of nanopillars in an arrangement period is complementary to a phase change, at a mutation point, of an LCoS diffraction grating corresponding to the preset deflection angle set in the WSS. In this case, a phase image of the LCoS and a phase image of the array element are fixed, and a modulation requirement is met. In another possible implementation, the arrangement distance is any value, In this case, a phase image of the LCoS is determined based on a phase image of the array element and a deflection angle required by the optical signal in the WSS. Because the phase image of the array element is determined based on a value of the arrangement distance, when the deflection angle required by the optical signal in the WSS is determined, the phase image of the LCoS may be obtained through calculation based on the phase image of the array element and the deflection angle required by the optical signal in the MISS, and then the LCoS is adjusted. In this way, a center distance and an arrangement period of the nanopillars are determined based on different situations, and the diffraction sub-peaks when the optical signals pass through the LCoS are suppressed more specifically, thereby improving isolation of the WSS.

In an example solution, when the wavefront control element is a diffractive optical element, the array element includes a plurality of level steps of different heights, and a width of the level step is less than a wavelength of the multi-wavelength optical signal. The height is an edge of the level step perpendicular to a bottom surface of the array element, and the width is an edge of the level step parallel to the bottom surface of the array element in a row direction (that is, in an M direction in the N*M array elements). When the diffractive optical element is used as the wavefront control element, the optical element is usually processed through etching. Such a processing manner is more convenient.

In another example solution, the wavefront control element and the LCoS are integrated into a whole (that is, the integrated LCoS). In this case, optionally, the wavefront control element may be a diffractive optical element or a super-surface optical element. in this embodiment, the wavefront control element may alternatively be a surface plasma optical element or a diffraction grating. Specific details are not limited herein, provided that the following function can be implemented: the wavefront control element and the LCoS jointly modulate the optical signals transmitted through the M wavelength channels, so that the WSS suppresses the diffraction sub-peaks generated when the optical signals transmitted through the N*M wavelength channels pass through the LCoS. In this embodiment, the wavefront control element and the LCoS in the beam deflection component group are integrated into a whole, so that a design space of the WSS can be effectively reduced, and a structure size of the WSS can be reduced.

Based on the foregoing solution, different cases of the wavefront control element are described as follows:

In an example solution, when the wavefront control element is a super-surface optical element, the integrated LCoS includes the super-surface optical element, a glass cover, a transparent electrode, an alignment layer, a liquid crystal layer, a reflective coating, a complementary metal oxide semiconductor (CMOS) substrate, and a printed circuit board (PCB). The super-surface optical element, the glass cover, the transparent electrode, the alignment layer, the liquid crystal layer, the reflective coating, the CMOS substrate, and the PCB are sequentially connected.

In another example solution, when the wavefront control element is a super-surface optical element, the integrated LCoS includes a glass cover, a transparent electrode, an alignment layer, a liquid crystal layer, the super-surface optical element, a spacer layer, a reflective coating, a CMOS substrate, and a PCB. The glass cover, the transparent electrode, the alignment layer, the liquid crystal layer, the super-surface optical element, the spacer layer, the reflective coating, the CMOS substrate, and the PCB are sequentially connected.

In this embodiment, the wavefront control element in the integrated LCoS may have each structure and function of the wavefront control element that is used as an independent component, and details are not described herein again. In addition, the wavefront control element in the integrated LCoS may further have the following features:

Nanopillars in the super-surface optical element are arranged in columns, widths of the plurality of nanopillars may be any values, and heights of the nanopillars are less than the wavelength of the optical signal corresponding to the array element. A center distance between adjacent nanopillars in each column of nanopillars is less than a half of the wavelength of the optical signal corresponding to the array element. In addition, to ensure that a pixel of the LCoS corresponds to an integer quantity of nanopillars, the center distance needs to be equal to a divisor of a pixel width of the LCoS. That is, each $X*Y$ nanopillars may correspond to one array element, and also correspond to one pixel of the LCoS, Both X and Y are integers, and X and Y may be a same value or different values. This is not specifically limited herein. Herein, that the $X*Y$ nanopillars correspond to one pixel of the LCoS is equivalent to that the $X*Y$ nanopillars correspond to one optical signal.

In another example solution, when the wavefront control element is a diffractive optical element, the integrated LCoS includes the diffractive optical element, a glass cover, a transparent electrode, an alignment layer, a liquid crystal layer, a reflective coating, a CMOS substrate, and a PCB. The diffractive optical element, the glass cover, the transparent electrode, the alignment layer, the liquid crystal layer, the reflective coating, the CMOS substrate, and the PCB are sequentially connected. In this embodiment, the wavefront control element in the integrated LCoS may have each structure and function of the wavefront control element that is used as an independent component, and details are not described herein again. In addition, the wavefront control element in the integrated LAMS may further have the following features: The array element in the diffractive optical element includes a plurality of level steps of different heights. A height of the level step may be any value. The height of the level step is an edge of the level step perpendicular to a bottom surface of the diffractive optical element. A center distance between adjacent level steps in each column of level steps is less than a half of the wavelength of the optical signal corresponding to the array element. In addition, to ensure that a pixel of the LCoS corresponds to an integer quantity of level steps, the center distance needs to be equal to a divisor of a pixel width of the LCoS. That is, each $Q*T$ level steps may correspond to one array element, and also correspond to one pixel of the LCoS. Both Q and T are positive integers, and Q and T may be a same value or different values. This is not specifically limited herein. Herein, that each $Q*T$ level steps correspond to one pixel of the LCoS is equivalent to that the $Q*T$ level steps correspond to one optical signal.

Based on the WSS described in the foregoing solutions, a design solution of array elements in adjacent columns of the $N*M$ array elements varies with different application scenarios indicated by center wavelengths of the multi-wavelength optical signals and channel bandwidths, which may be specifically as follows:

In an example solution, when the application scenario of the optical signals is facing a discrete passband, array elements in different columns of the $N*M$ array elements have different structures.

In another example solution, when the application scenario of the optical signals is a wide spectrum facing FlexGrid, array elements in all columns of the $N*M$ array elements have a same structure.

In another example solution, when the application scenario of the optical signals is an overlapped spectrum facing FlexGrid, the $N*M$ array elements are grouped into R groups in columns, each group includes S adjacent columns, array elements in a same group have a same structure, and array elements in different groups have different structures. A product of R and S is equal to M. Array elements of a same group are applicable to a same overlapped spectrum. That is, in this embodiment, the $N*M$ array elements are grouped in columns based on overlapped spectrums. For example, array elements applicable to a spectrum of 0 to 200 Hz are grouped into an array element group, and the array elements in the group have a same structure.

It may be understood that, in the scenario of facing a discrete passband, center frequency spacings between different wavelength channels are the same, For example, there are 10 wavelength channels, center frequency spacings between different wavelength channels are 50 GHz, and a bandwidth of 50 GHz may be covered. In the scenario of a wide spectrum facing FlexGrid, different wavelength channels have a same center frequency and the center frequency is a wide spectrum. For example, there are 10 wavelength channels, and all the wavelength channels have a same center frequency, that is, have a same center wavelength, and a bandwidth of 500 GHz is covered. In the scenario of an overlapped spectrum facing FlexGrid, center frequencies of adjacent wavelength channels overlap. For example, a center frequency spacing between different wavelength channels is 50 GHz, and a covered bandwidth is greater than 50 GHz, for example, 100 GHz.

Optionally, in this embodiment, the demultiplexing/multiplexing grating group may include one or two demultiplexing/multiplexing gratings. Details are as follows:

In an example solution, when the demultiplexing/multiplexing grating group includes one demultiplexing/multiplexing grating, the multi-wavelength optical signals are input from the input port fiber array and transmitted to the demultiplex/multiplexing grating. One surface of the demultiplexing/multiplexing grating demultiplexes the multi-wavelength optical signals to the $N*M$ wavelength channels for transmission. The beam deflection component group deflects, to the demultiplexing/multiplexing grating, the optical signals transmitted through the $N*M$ wavelength channels. Another surface of the demultiplexing/multiplexing grating multiplexes, to the output port fiber array, the optical signals transmitted through the $N*M$ wavelength channels.

In another example solution, when the demultiplexing/multiplexing grating group includes two demultiplexing/multiplexing gratings: a first demultiplexing/multiplexing grating and a second demultiplexing/multiplexing grating. The multi-wavelength optical signals are input from the input port fiber array, and transmitted to the first demultiplexing/multiplexing grating. The first demultiplexing/multiplexing grating demultiplexes the multi-wavelength optical signals to the N*M wavelength channels for transmission. The beam deflection component group deflects, to the second demultiplexing/multiplexing grating, the optical signals transmitted through the N*M wavelength channels. The second demultiplexing/multiplexing grating multiplexes, to the output port fiber array, the optical signals transmitted through the N*M wavelength channels. In this way, a corresponding combination manner may be selected for the demultiplexing/multiplexing grating group based on an actual situation, to increase structural diversity of the WSS, According to a second aspect, an embodiment of this application provides a wavefront control element, which is applied to a WSS including at least one LAMS, and specifically includes: N*M arm elements. N represents rows, configured to correspond to N ports in the WSS, and array elements in a same row are configured to correspond to different wavelength channels of a same port. M represents columns, configured to correspond to M wavelength channels in the WSS, and array elements in a same column are configured to correspond to different ports of a same wavelength channel. Both N and M are positive integers. Wavefront control introduced by each of the N*M array elements is determined based on a phase image formed by each spot unit and deflection angle of the LCoS in the WSS. Each of the N*M array elements modulates a corresponding optical signal in N*M optical signals received by the input port fiber array, so that the WSS suppresses a diffraction sub-peak generated when the corresponding optical signal passes through the LCoS. Array elements in a same column of the N*M array elements have a same structure. In addition, in this embodiment, structures of array elements in different columns of the N*M array elements are determined based on center wavelengths of multi-wavelength optical signals received by the MISS and a channel bandwidth. In this embodiment, the wavefront control includes intensity and phase control, which is specifically determined based on a requirement of the WSS.

Optionally, when the wavefront control element is a super-surface optical element, the array element includes a plurality of nanopillars, a width of the nanopillar is less than or equal to a wavelength of the optical signal corresponding to the array element, and a height of the nanopillar is less than or equal to the wavelength of the optical signal corresponding to the array element. The plurality of nanopillars are grouped and arranged in columns. A length of each column of nanopillars is equal to a length of the array element in a column direction (that is, a length of all nanopillar arrangement in each column is equal to a length of an edge of the array element in the column direction, where in the N*M array elements, a direction along N is the column direction). A width occupied by each column of nanopillars is d, arrangement positions of nanopillars between adjacent columns are the same, and d is greater than or equal to a width of a nanopillar with a maximum size in the nanopillars and less than or equal to a pixel width of the LCoS. It may be understood that, in this embodiment, the nanopillars are arranged in a center-aligned manner.

Based on the foregoing solution, each column of nanopillars is arranged based on an arrangement period. The arrangement period is determined based on LCoS diffraction grating periods corresponding to a preset deflection angle set in the WSS (it may be understood that the arrangement period may be equal to an average value of the LAMS diffraction grating periods corresponding to the preset deflection angle set in the WSS, or may be any value of the LCoS diffraction grating periods corresponding to the preset deflection angle set in the WSS). The preset deflection angle set includes a maximum deflection angle of the WSS and at least one of deflection angles within a preset range from the maximum deflection angle. For example, if the maximum deflection angle of the WSS is 10 degrees, the preset deflection angle set may include 10 degrees, 9 degrees, and 8 degrees. In the foregoing arrangement manner, an arrangement distance between adjacent nanopillars in one column of nanopillars may be implemented in the following several possible manners: In a possible implementation, the arrangement distance meets that a regulated phase of nanopillars in an arrangement period is complementary to a phase change, at a mutation point, of an LCoS diffraction grating corresponding to the preset deflection angle set in the WSS. In this case, a phase image of the LCoS and a phase image of the array element are fixed, and a modulation requirement is me. In another possible implementation, the arrangement distance is any value. In this case, a phase image of the LCoS is determined based on a phase image of the array element and a deflection angle required by the optical signal in the WSS. Because the phase image of the array element is determined based on a value of the arrangement distance, when the deflection angle required by the optical signal in the WSS is determined, the phase image of the LCoS may be obtained through calculation based on the phase image of the array element and the deflection angle required by the optical signal in the WSS, and then the LCoS is adjusted: In this way, a design solution of the WSS may be determined based on an actual requirement, to ensure adaptability of the WSS in different scenarios.

Optionally, when the wavefront control element is a diffractive optical element, the array element includes a plurality of level steps of different heights, and a width of the level step is less than a wavelength of the optical signal corresponding to the array element. The height is an edge of the level step perpendicular to a bottom surface of the array element, and the width is an edge of the level step parallel to the bottom surface of the array element in a row direction.

According to a third aspect, an embodiment of this application provides an integrated LCoS, whose specific structure includes: a wavefront control element, a glass cover, a transparent electrode, an alignment layer, a liquid crystal layer, a reflective coating, a CMOS substrate, and a PCB. The wavefront control element, the glass cover, the transparent electrode, the alignment layer, the liquid crystal layer, the reflective coating, the CMOS substrate, and the PCB are sequentially connected.

Optionally, the wavefront control element includes N*M array elements. N represents rows, configured to correspond to N ports, and array elements in a same row are configured to correspond to different wavelength channels of a same port. M represents columns, configured to correspond to the M wavelength channels, and array elements in a same column are configured to correspond to different ports of a same wavelength channel. Both N and M are positive integers. Wavefront control introduced by each of the N*M array elements is determined based on a phase image formed by each spot unit and deflection angle of the LCoS. Each of the N*M array elements modulates a corresponding optical signal in N*M optical signals received by the input port fiber array, so that the WSS suppresses a diffraction sub-peak generated when the corresponding optical signal passes through the LCoS. Array elements in a same column of the N*M array elements have a same structure. In this embodiment, the wavefront control includes intensity and phase control, which is specifically determined based on a specific requirement of the WSS.

Optionally, when the wavefront control element is a super-surface optical element, the array element includes a plurality of nanopillars, a width of the nanopillar is less than or equal to a wavelength of the optical signal corresponding to the array element, and a height of the nanopillar is less than or equal to the wavelength of the optical signal corresponding to the array element.

The plurality of nanopillars are grouped and arranged in columns.

A width occupied by each column of nanopillars is d, arrangement positions of nanopillars between adjacent columns are the same, and d is greater than or equal to a width of a nanopillar with a maximum size in the nanopillars and less than or equal to a pixel width of the LCoS.

Optionally, each column of nanopillars in the array element is arranged based on an arrangement period, the arrangement period is equal to an average value of LCoS diffraction grating periods corresponding to a preset deflection angle set in the WSS, or the arrangement period is any value of the LCoS diffraction grating periods corresponding to the preset deflection angle set in the WSS, and the preset deflection angle set includes a maximum deflection angle of the WSS and at least one of deflection angles within a preset range from the maximum deflection angle.

Optionally, nanopillars in the super-surface optical element are arranged in columns, widths of the plurality of nanopillars may be any values, and heights of the nanopillars are less than the wavelength of the optical signal corresponding to the array element. A center distance between adjacent nanopillars in each column of nanopillars is less than a half of the wavelength of the optical signal corresponding to the array element. In addition, to ensure that a pixel of the LCoS corresponds to an integer quantity of nanopillars, the center distance needs to be equal to a divisor of a pixel width of the LCoS. That is, each X*Y nanopillars may correspond to one array element, and also correspond to one pixel of the LCoS. Both X and Y are integers, and X and Y may be a same value or different values. This is not specifically limited herein. Herein, that the X*Y nanopillars correspond to one pixel of the LCoS is equivalent to that the X*Y nanopillars correspond to one optical signal.

Optionally, when the wavefront control element is a diffractive optical element, the array element includes a plurality of level steps of different heights, and a width of the level step is less than a wavelength of the optical signal corresponding to the array element. The height is an edge of the level step perpendicular to a bottom surface of the array element, and the width is an edge of the level step parallel to the bottom surface of the array element in a row direction.

Optionally, the array element in the diffractive optical element includes a plurality of level steps of different heights. A height of the level step may be any value. The height of the level step is an edge of the level step perpendicular to a bottom surface of the diffractive optical element. A center distance between adjacent level steps in each column of level steps is less than a half of the wavelength of the optical signal corresponding to the array element. In addition, to ensure that a pixel of the LCoS corresponds to an integer quantity of nanopillars, the center distance needs to be equal to a divisor of a pixel width of the LCoS. That is, each Q*T level steps may correspond to one array element, and also correspond to one pixel of the LCoS. Both Q and T are positive integers, and Q and T may be a same value or different values. This is not specifically limited herein. Herein, that each Q*T level steps correspond to one pixel of the LCoS is equivalent to that the Q*T level steps correspond to one optical signal.

According to a fourth aspect, an embodiment of this application provides an integrated LCoS, whose specific structure includes: a glass cover, a transparent electrode, an alignment layer, a liquid crystal layer, a super-surface optical element, a spacer layer, a reflective coating, a CMOS substrate, and a PCB. The glass cover, the transparent electrode, the alignment layer, the liquid crystal layer, the super-surface optical element, the spacer layer, the reflective coating, the CMOS substrate, and the PCB are sequentially connected, In the technical solution provided in this embodiment of this application, the wavefront control element is directly integrated with a conventional LCoS element, so that integration of an entire optical system is higher. In addition, such a new LCoS may be used as a separate optical element for light field control, beam shaping, and other application scenarios such as projection display and lidars.

Optionally, the wavefront control element includes N*M array elements. N represents rows, configured to correspond to the N ports, and array elements in a same row are configured to correspond to different wavelength channels of a same port. M represents columns, configured to correspond to the M wavelength channels, and array elements in a same column are configured to correspond to different ports of a same wavelength channel. Both N and M are positive integers. Wavefront control introduced by each of the N*M array elements is determined based on a phase image formed by each spot unit and deflection angle of the LCoS. Each of the N*M array elements modulates a corresponding optical signal in N*M optical signals received by the input port fiber array, so that the WSS suppresses a diffraction sub-peak generated when the corresponding optical signal passes through the LCoS. Array elements in a same column of the N*M array elements have a same structure. In this embodiment, the wavefront control includes intensity and phase control, which is specifically determined based on a requirement of the WSS.

Optionally, when the wavefront control element is a super-surface optical element, the array element includes a plurality of nanopillars, a width of the nanopillar is less than or equal to a wavelength of the optical signal corresponding to the array element, and a height of the nanopillar is less than or equal to the wavelength of the optical signal corresponding to the array element.

The plurality of nanopillars are grouped and arranged in columns.

A width occupied by each column of nanopillars is d, arrangement positions of nanopillars between adjacent columns are the same, and d is greater than or equal to a width of a nanopillar with a maximum size in the nanopillars and less than or equal to a pixel width of the LCoS.

Optionally, each column of nanopillars in the array element is arranged based on an arrangement period, the arrangement period is equal to an average value of LCoS diffraction grating periods corresponding to a preset deflection angle set in the WSS, or the arrangement period is any value of the LCoS diffraction grating periods corresponding to the preset deflection angle set in the WSS, and the preset deflection angle set includes a maximum deflection angle of the WSS and at least one of deflection angles within a preset range from the maximum deflection angle.

Optionally, nanopillars in the super-surface optical element are arranged in columns, widths of the plurality of nanopillars may be any values, and heights of the nanopillars are less than the wavelength of the optical signal corresponding to the array element. A center distance between adjacent nanopillars in each column of nanopillars is less than a half of the wavelength of the optical signal corresponding to the array element. In addition, to ensure that a pixel of the LCoS corresponds to an integer quantity of nanopillars, the center distance needs to be equal to a divisor of a pixel width of the LCoS. That is, each X*Y nanopillars may correspond to one array element, and also correspond to one pixel of the LCoS. Both X and Y are integers, and X and Y may be a same value or different values. This is not specifically limited herein. Herein, that the X*Y nanopillars correspond to one pixel of the LCoS is equivalent to that the X*Y nanopillars correspond to one optical signal.

According to a fifth aspect, an embodiment of this application provides an integrated LCoS, whose specific structure includes: a wavefront control element, a transparent electrode, an alignment layer, a liquid crystal layer, a reflective coating, a CMOS substrate, and a PCB. The wavefront control element, the transparent electrode, the alignment layer, the liquid crystal layer, the reflective coating, the CMOS substrate, and the PCB are sequentially connected.

In the technical solution provided in this embodiment of this application, the wavefront control element is directly integrated with a conventional LCoS element, so that integration of an entire optical system is higher. In addition, such a new LCoS may be used as a separate optical element for light field control, beam shaping, and other application scenarios such as projection display and lidars.

Optionally, the wavefront control element uses a glass cover as a base, and is obtained through processing on the glass cover. Further, the wavefront control element is a super-surface optical element or a diffractive optical element.

In the technical solutions provided in embodiments of this application, the wavefront control element is added to the beam deflection component group of the WSS, so that the wavefront control element and the original LCoS jointly modulate the optical signals transmitted through the N ports and the M wavelength channels. In this way, the WSS suppresses the diffraction sub-peaks of the optical signals transmitted through the M wavelength channels, thereby improving isolation and greatly reducing crosstalk of the WSS.

DESCRIPTION OF EMBODIMENTS

Embodiments of this application provide a wavelength selective switch WSS, to suppress diffraction sub-peaks of deflected beams and improve isolation, thereby greatly reducing crosstalk of the WSS.

In this application, terms such as "first", "second", "third", and "fourth" (if exists) in the specification, the claims, and the accompanying drawings are intended to distinguish between similar objects but do not necessarily indicate a specific order or sequence. It should be understood that data used in such a way are interchangeable in proper cases so that the embodiments described herein can be implemented in an order except the order illustrated or described herein. In addition, terms such as "comprise", "have", and any variations thereof are intended to cover non-exclusive inclusions, for example, a process, method, system, product, or device that includes a series of steps or units is not necessarily limited to those clearly listed steps or units, but may include other steps or units that are not clearly listed or inherent to such a process, method, product, or device.

Figure 1A:
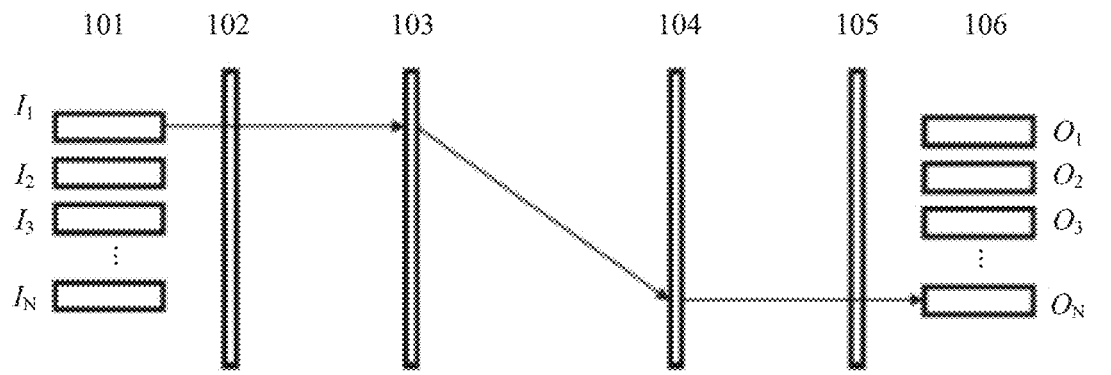
FIG. 1A is a schematic diagram of a working principle of a WSS.
Figure 1B:
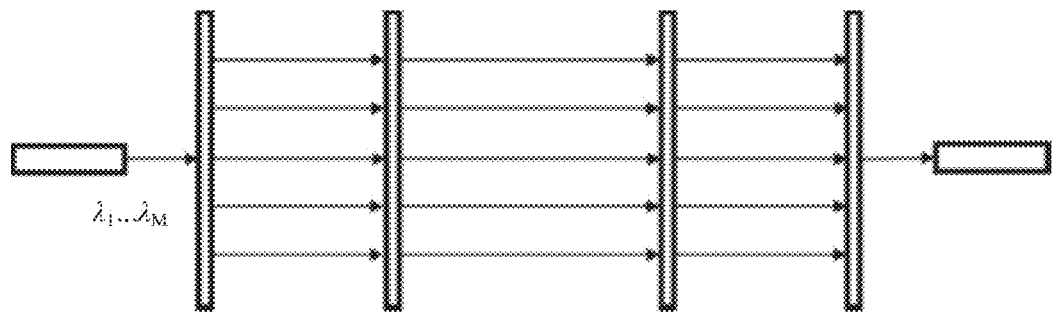
FIG. 1B is a schematic diagram of an example structure of a WSS in a top view state.

Optical networks are continuously evolving towards large capacity, low latency, and intelligence. Optical switching technologies such as a ROADM and an OXC not only support current commercial optical networks, but also are one of key technologies for implementing next-generation optical networks. A WSS is a core component of the OXC, and port/channel expansion of the WSS has an urgent need and practical value. A conventional WSS uses an LcoS as its core switching engine, to implement optical path switching. The LAMS is a reflective diffraction grating programmable to realize a specific phase distribution, whose main function is to deflect an incident beam to a corresponding emergent direction. FIG. 1A and FIG. 1B are schematic diagrams of a principle of a WSS. The apparatus is an N×N WSS, that is, the WSS has N input ports and N output ports, to implement all-optical connection in any pairing between the input ports and the output ports. FIG. 1A is a main view of the WSS. FIG. 1B is a corresponding top view of the WSS. Main components of the apparatus include an input port fiber array 101, an output port fiber array 106, demultiplexing/multiplexing gratings 102 and 105, a first-stage LCoS 103, and a second-stage LCoS 104. The LCoSs are reflective components. To visually express a beam deflection angle relationship between the first-stage LCoS 103 and the second-stage LCoS 104 (deflection angles are equal), a refraction diagram in FIG. 1A is used for illustration. For different input ports, the first-stage LCoS 103 may independently deflect corresponding beams. For different output ports, the second-stage LCoS 104 may independently deflect corresponding beams. With development of optical networks, a port quantity of the WSS is greatly expanded. Due to limitations of a structure size and an optical path design of the WSS and the port quantity expansion of the WSS, a maximum beam deflection angle required for optical path switching of the WSS is correspondingly increased. If the same LCoS switching engine is used, to increase the maximum beam deflection angle, diffraction efficiency and isolation of deflected beams are inevitably decreased, which increases crosstalk of the WSS.

Figure 2:
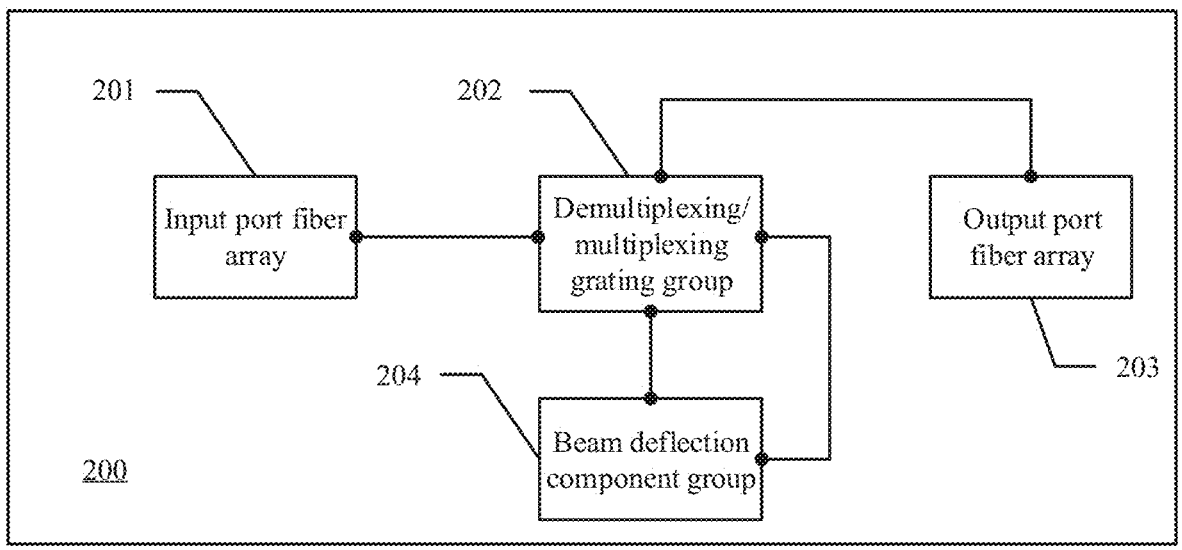
FIG. 2 is a schematic diagram of a structure of a WSS according to an embodiment of this application.

To resolve this problem, an embodiment of this application provides the following WSS, whose specific structure is shown in FIG. 2. The WSS 200 includes: an input port fiber array 201, a demultiplexing/multiplexing grating group 202, an output port fiber array 203, and a beam deflection component group 204. The beam deflection component group 204 includes two beam deflection components and at least one wavefront control element, and at least one beam deflection component is a liquid crystal on silicon LCoS. The at least one wavefront control element is located on an optical path between the demultiplexing/multiplexing grating group 202 and the beam deflection component group 204, or the wavefront control element and the LCoS are integrated into an integrated LCoS. The input port fiber array 201 includes N ports, and the ports receive multi-wavelength optical signals. The demultiplexing/multiplexing grating group 202 &multiplexes the multi-wavelength optical signals to N*M wavelength channels. The beam deflection component group 204 deflects, to the demultiplexing multiplexing grating group 202, the optical signals transmitted through the N*M wavelength channels. The demultiplexing/multiplexing grating group 202 multiplexes, to the output port fiber array 203, the optical signals transmitted through the N*M wavelength channels. The wavefront control element and the LCoS jointly modulate the optical signals transmitted through the N*M wavelength channels, so that the WSS suppresses diffraction sub-peaks generated when the optical signals transmitted through the N*M wavelength channels pass through the LCoS.

It may be understood that, in this embodiment of this application, the beam deflection component in the beam deflection component group may alternatively be a micro-electro-mechanical system (MEMS). Therefore, a combination manner of the beam deflection component group may be an MEMS and an LCoS, or two LCoSs.

Figure 3A:
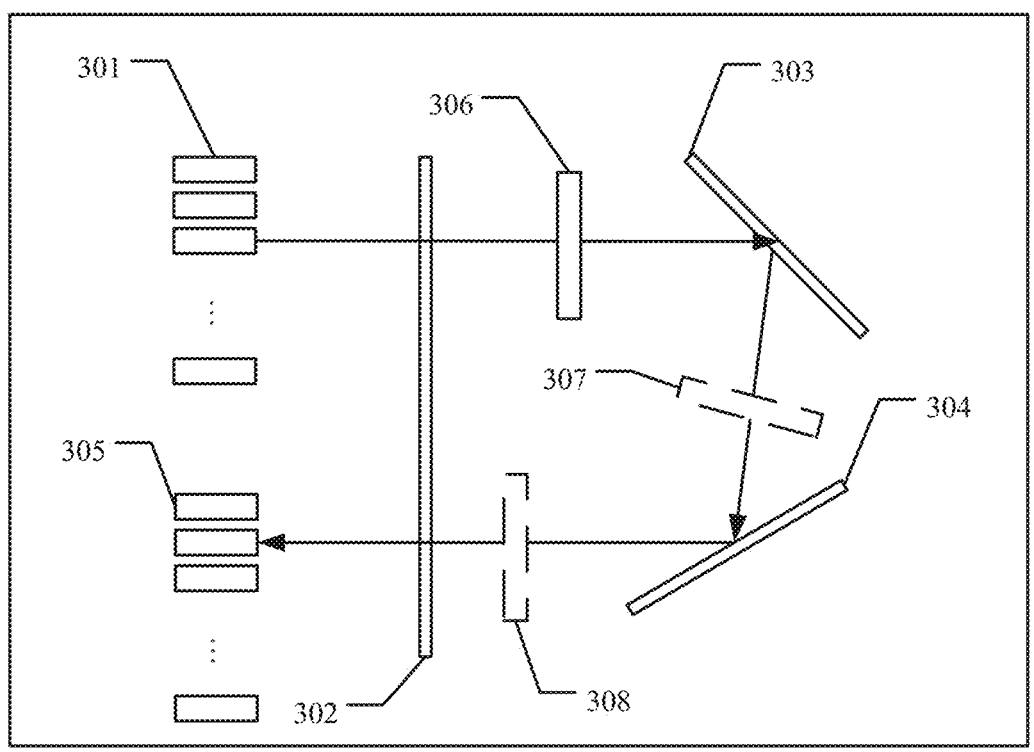
FIG. 3A is a schematic diagram of another structure of a WSS according to an embodiment of this application.

In this embodiment, the demultiplexing/multiplexing grating group may include one or two demultiplexing/multiplexing gratings. When the demultiplexing/multiplexing grating group includes one demultiplexing/multiplexing grating, and the beam deflection component group includes two LCoSs, a structure of the WSS may be shown in FIG. 3A. A schematic diagram of an embodiment of the WSS in embodiments of this application (only a front view is used for description in this embodiment) includes: an input port fiber array 301, a first demultiplexing/multiplexing grating 302, a first-stage LCoS 303, a second-stage LCoS 304, a second demultiplexing/multiplexing grating 305, and at least one of an output port fiber array 306, a wavefront control element 307, and a wavefront control element 308. An optical path between the components is shown in FIG. 3A, and FIG. 3A shows only one possible connection manner. An optical path between the components is shown in FIG. 3A, and FIG. 3A shows only one possible connection manner. It may be understood that, in this embodiment, a quantity of wavefront control elements may exceed a quantity shown in FIG. 3A, and positions of the wavefront control elements may be not only positions shown in FIG. 3A, provided that they are located on an optical path between the first demultiplexing/multiplexing grating 302 and the first-stage LCoS 303, an optical path between the first demultiplexing/multiplexing grating 302 and the second-stage LCoS 304, and an optical path between the first-stage LCoS 303 and the second-stage LCOS 304. A specific situation is not limited herein.

Figure 3B:
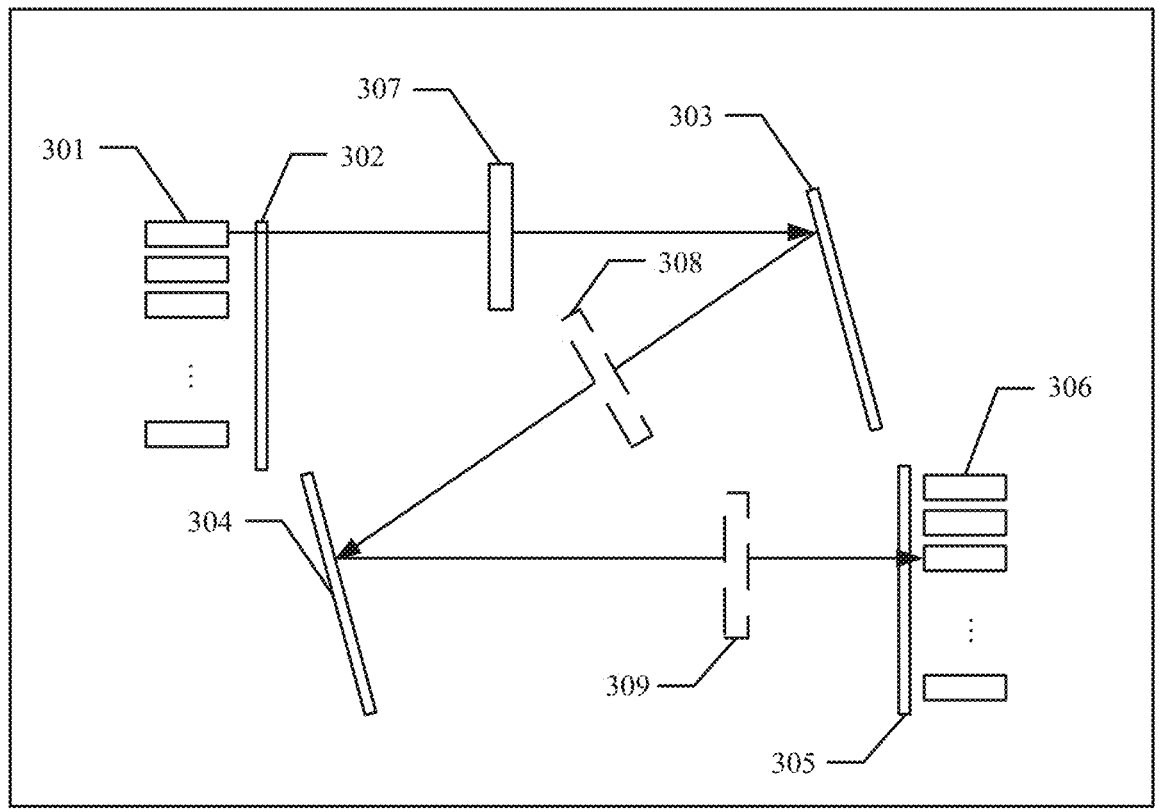
FIG. 3B is a schematic diagram of another structure of a WSS according to an embodiment of this application.

The WSS in this embodiment of this application is described below by using an example in which the demultiplexing/multiplexing grating group includes two demultiplexing/multiplexing gratings and the beam deflection component group includes two LCoSs. For details, refer to FIG. 3B. A schematic diagram of an embodiment of the WSS in embodiments of this application (only a front view is used for description in this embodiment) includes:

an input port fiber array 301, a first demultiplexing/multiplexing grating 302, a first-stage LCoS 303, a second-stage LCoS 304, a second demultiplexing/multiplexing grating 305, an output port fiber array 306, and at least one of a wavefront control element 307, a wavefront control element 308, and a wavefront control element 309. An optical path between the components is shown in FIG. 3B, and FIG. 3B shows only one possible connection manner. It may be understood that, in this embodiment, a quantity of wavefront control elements may exceed a quantity shown in FIG. 3B, and positions of the wavefront control elements may be not only positions shown in FIG. 3B, provided that they are located on an optical path between the first demultiplexing/multiplexing grating 302 and the second demultiplexing/multiplexing grating 305. A specific situation is not limited herein.

The following describes functions of the components of the WSS in this embodiment of this application.

The input port fiber array 301 includes N ports, and the ports receive multi-wavelength optical signals, so that the multi-wavelength optical signals are input to the WSS.

The first demultiplexing/multiplexing grating 302 demultiplexes, to N*M wavelength channels, the optical signals input from the input port fiber array 301. That is, after passing through the first demultiplexing/multiplexing grating, a multi-wavelength signal received by one port is demultiplexed and output to M wavelength channels corresponding to the port. Generally, an optical system is disposed to collimate corresponding beams of the N ports and the M wavelength channels, which is not shown in FIG. 3B.

The first-stage LCoS 303 deflects the corresponding beams of the N ports and the M wavelength channels (that is, optical signals transmitted through the N ports and the M wavelength channels) to the second-stage LCoS 304.

The second-stage JAMS 304 deflects the corresponding beams of the N ports and the M wavelength channels (that is, the optical signals transmitted through the N ports and the M wavelength channels) to the second demultiplexing/multiplexing grating 305.

The second demultiplexing/multiplexing grating 305 multiplexes, to the output port fiber array 306, the optical signals of the N*M wavelength channels. That is, the second demultiplexing/multiplexing grating multiplexes optical signals of M wavelength channels of one port to a corresponding port of the output port fiber array. Similarly, optical signals of M wavelength channels of another port are correspondingly multiplexed to a corresponding port of the output port fiber array.

The output port fiber array 306 includes N ports, and the ports output the multi-wavelength optical signals out of the WSS.

Figure 4:
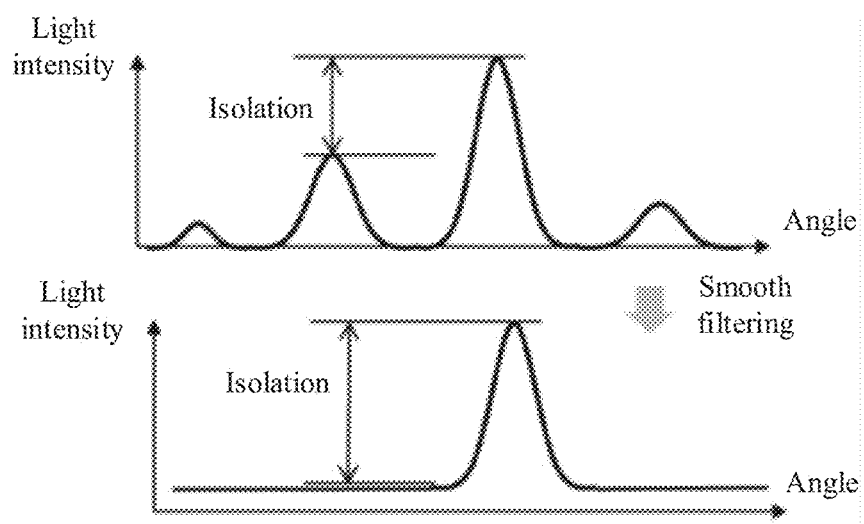
FIG. 4 is a schematic diagram of a working effect of a WSS according to an embodiment of this application.

At least one or none of the wavefront control element 307, the wavefront control element 308, or the wavefront control element 309 is placed at relative positions, but at least one wavefront control element exists on the optical path between the first demultiplexing/multiplexing grating 302 and the second demultiplexing/multiplexing grating 305. The wavefront control element is passive and divided into array elements, and the array elements are in a one-to-one correspondence with beams of different ports/wavelength channels. Each array element has an optical structure characteristic for implementing wavefront control. The wavefront control element, together with the first-stage LCoS 303 and/or the second-stage LCoS 304, implements high isolation of deflected beams, to suppress crosstalk of the WSS. An effect generated by them is shown in FIG. 4. A height of each original diffraction sub-peak is reduced, so that isolation between diffraction sub-peaks is enlarged.

The WSS is specifically described below with respect to different cases of the wavefront control element.

Figure 5:
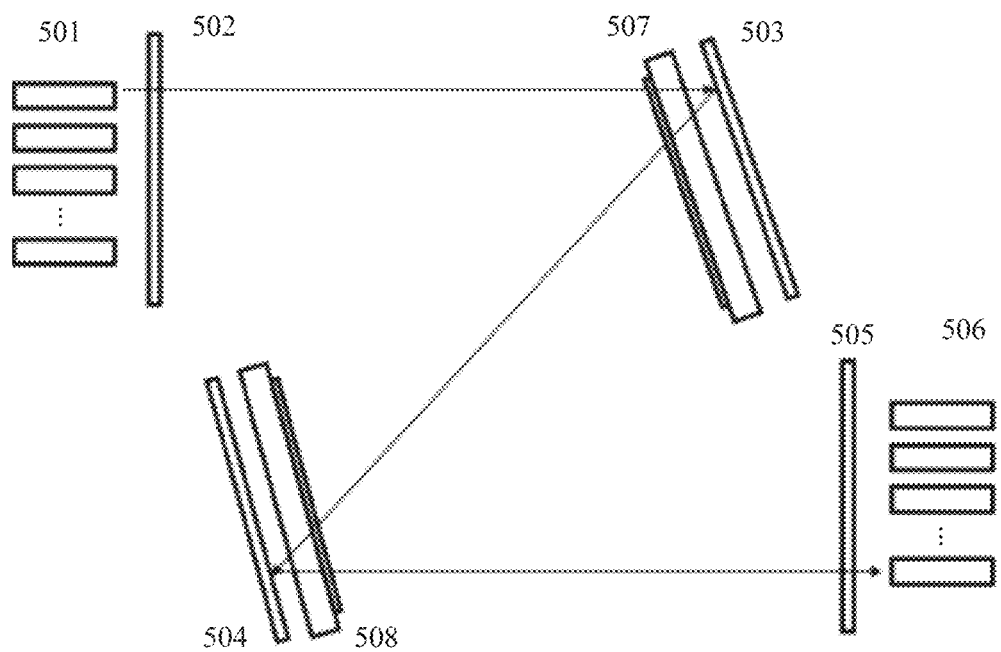
FIG. 5 is a schematic diagram of another structure of a WSS according to an embodiment of this application.

In a possible implementation solution, the wavefront control element is a super-surface optical element, and the wavefront control element is separated from the beam deflection component. An example solution of a specific structure of the WSS may be shown in FIG. 5, and specifically includes:

an input port fiber array 501, a first demultiplexing/multiplexing grating 502, a first-stage LCoS 503, a second-stage LCoS 504, a second demultiplexing/multiplexing grating 505, an output port fiber array 506, a first wavefront control element 507, and a second wavefront control element 508. A specific connection manner between them is shown in FIG. 5. The input port fiber array 501, the first demultiplexing/multiplexing grating 502, the first wavefront control element 507, the first-stage LCoS 503, the second wavefront control element 508, the second-stage LCoS 504, the second demultiplexing/multiplexing grating 505, and the output port fiber array 506 are sequentially connected. It may be understood that the connection in this embodiment is not equal to physical connection, but is used to describe a transmission path of an optical signal in the components. The first wavefront control element 507 and the second wavefront control element 508 have a same structure, whose specific structure may be shown in FIG. 6. The first wavefront control element 507 and the second wavefront control element 508 are super-surface optical elements, the super-surface optical element includes two layers, one layer is a film 602, and one layer is a base 603. The film 602 includes N*M array elements 601. Array elements in a same row correspond to M wavelength channels of a same port, and array elements in a same column correspond to N ports of a same wavelength channel. The array elements in the same column have a same structure, and structures of array elements in different columns are determined based on center wavelengths of the optical signals and a channel bandwidth. Wavefront control introduced by each of the N*M array elements is determined based on a phase image formed by each spot unit and deflection angle of the JAMS. In this embodiment, the wavefront control includes intensity and phase control.

Figure 6:
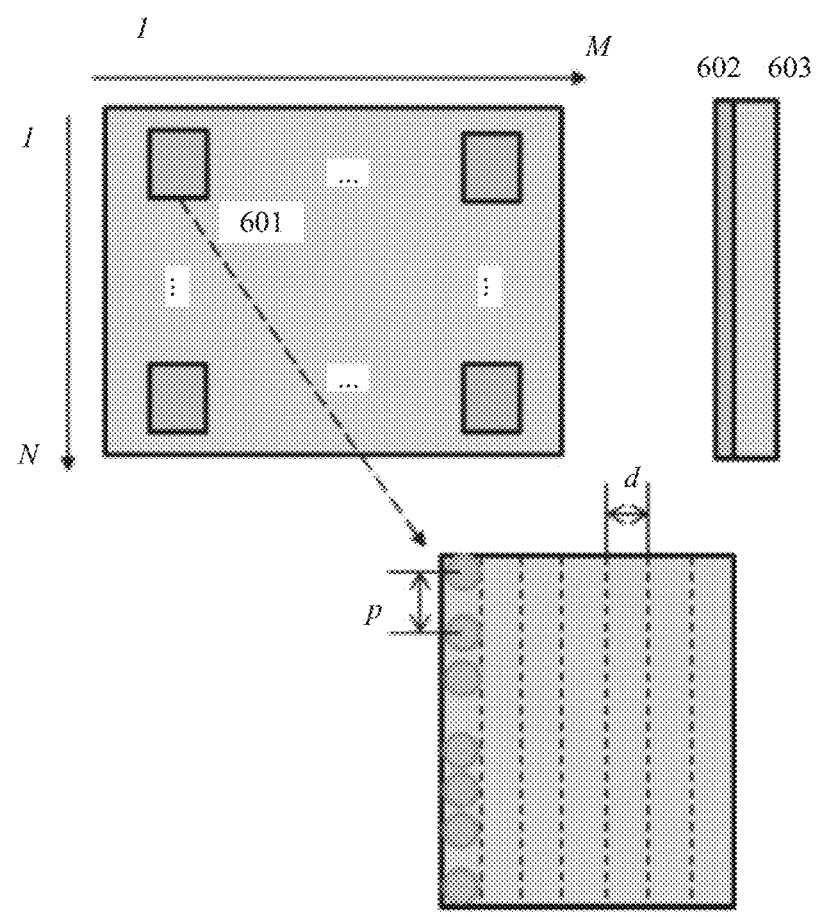
FIG. 6 is a schematic diagram of a structure of an array element of a super-surface optical element according to an embodiment of this application.

A specific structure of the array element 601 may be shown in FIG. 6, which includes a plurality of nanopillars. A width of each nanopillar is less than or equal to a wavelength of a received optical signal corresponding to the array element, and a height of the nanopillar is also less than or equal to the wavelength of the received optical signal corresponding to the array element. The plurality of nanopillars are grouped and arranged in columns, and a length of each column of nanopillars is equal to a width of the array element 601 in an N direction (that is, a column direction). A width occupied by each column of nanopillars in an M direction (that is, a row direction) is d, arrangement positions of nanopillars between adjacent columns are the same, and d is greater than or equal to a maximum width in the nanopillars and less than or equal to a pixel width of the LCoS. A center distance between adjacent nanopillars in a same column of nanopillars is P. In the array element, sizes and structures of nanopillars in a same column may be different, or may be the same. This is not limited herein. In addition, the nanopillars are arranged in a center-aligned manner. Therefore, a width occupied by each column of nanopillars needs to be greater than or equal to a width occupied by a nanopillar with a maximum size in the column of nanopillars. In this embodiment, as shown in FIG. 6, arrangement positions and sizes of the nanopillars in the first column are determined, and nanopillars in each subsequent column copy the arrangement positions and the sizes of the nanopillars in the first column, and are sequentially arranged. In this embodiment, a structure of each column of nanopillars is designed based on a deflection angle required by a beam. In the array element of the super-surface optical element, each column of nanopillars is arranged based on an arrangement period. The arrangement period is determined based on LCoS diffraction grating periods corresponding to a preset deflection angle set in the WSS (it may be understood that the arrangement period may be equal to an average value of the LCoS diffraction grating periods corresponding to the preset deflection angle set in the WSS, or may be any value of the LCoS diffraction grating periods corresponding to the preset deflection angle set in the WSS). The preset deflection angle set includes a maximum deflection angle of the WSS and at least one of deflection angles within a preset range from the maximum deflection angle. Based on the foregoing arrangement manner, an arrangement distance (that is, P in FIG. 6) between adjacent nanopillars in one column of nanopillars may be implemented in the following several possible manners:

In a possible implementation, the arrangement distance P meets that a regulated phase of nanopillars in an arrangement period is complementary to a phase change, at a mutation point, of an LCoS diffraction grating corresponding to a preset deflection angle in the WSS.

In this embodiment, the maximum deflection angle is a maximum angle at which the LCoS component in the WSS implements beam deflection. For example, a deflection angle that can be implemented by the LCoS in the WSS ranges from −10° to 10°, that is, when an angle value is an integer value, the LCoS can achieve 21 deflection angles, and a maximum deflection angle is 10°.

A deflection angle near the maximum deflection angle is an angle within the preset range from the maximum deflection angle. For example, when the maximum deflection angle is 10°, assuming that the preset range is an angle within 3°, deflection angles near the maximum deflection angle may be 10°, 9°, and 8°.

The LCoS diffraction grating period is a period of a phase in which the LCoS realizes a periodic distribution of beam deflection. For example, at pixels 1 to 10, the LCoS corresponds to a phase distribution of linearly increasing from 0 to 2 pi, that is, corresponds to a phase distribution of one period. Then, at pixels 11 to 20, the LCoS corresponds to the phase distribution of linearly increasing from 0 to 2 pi. again. This cycles in turn.

The mutation point of the LCoS diffraction grating refers to a position at which a phase changes directly from 2 pi to 0 or from 2pi to 0. Based on the foregoing example, for example, a phase corresponding to the pixel 10 is 2 pi, and a phase corresponding to the pixel 11 is 0, the pixel 10 and the pixel 11 are a mutation point.

Based on the foregoing description, each column of nanopillars is arranged periodically. For example, 20 nanopillars are a period, and arrangement distances P between adjacent nanopillars in the 20 nanopillars are not necessarily the same, but a sum of the arrangement distances P of the 20 nanopillars is equal to an arrangement period. Based on the foregoing description, the arrangement period and the arrangement distance P of the nanopillars in the array element 601 are calculated. Based on the foregoing solution, in a specific implementation process, an input beam and an output beam may be further used as input and output constraints, and a phase image formed by a conventional LCoS algorithm is used as an initial value, which is iterated between an LCoS phase image correction value and a current nanopillar arrangement model (main parameters include a width, a height, and an arrangement distance P of nanopillars) to calculate an optimal LCoS phase image correction value and optimal parameters of the nanopillars. For example, the nanopillars may optionally have a width of about 800 nm (less than 1550 nm), and a height of about 1550 nm.

In another possible implementation, the arrangement distance P is a random value. In this case, a phase image of the LCoS is determined based on a phase image of the array element and a deflection angle required by the optical signal in the WSS. Because the phase image of the array element is determined based on a value of the arrangement distance P, when the deflection angle required by the optical signal in the WSS is determined, the phase image of the LCoS may be obtained through calculation based on the phase image of the array element and the deflection angle required by the optical signal in the WSS, and then the LCoS is adjusted.

It may be understood that a material for making the super-surface optical element may include, but is not limited to, Si, SiN, ITO, solid metal, and SiO2, that is, an example solution of a material composition of the super-surface optical element is as follows: A material of the film 602 is Si, a material of the base 603 is SiO2 glass, and a material of the nanopillars in the array element 601 is Si. Certainly, the material composition of the super-surface optical element may alternatively have another solution, which is not specifically limited herein. In this embodiment, the nano is defined as that a size of the nanopillar is in a nanometer scale, and the definition is also true for nano mentioned elsewhere in this embodiment of this application. In addition, a shape of the nanopillar may be a cylinder, or may be another possible shape, such as a square pillar. A specific shape is not limited herein, provided that a function of the array element can be implemented.

Figure 7:
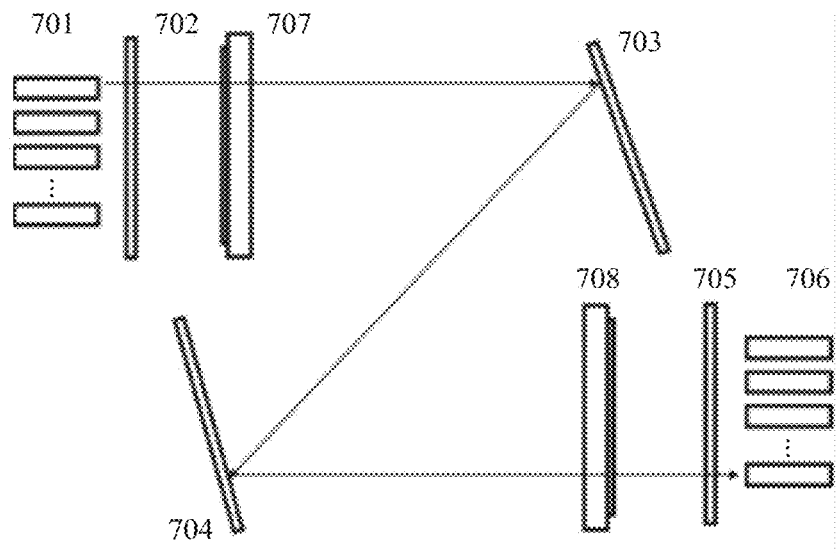
FIG. 7 is a schematic diagram of another structure of a WSS according to an embodiment of this application.

In another possible implementation solution, the wavefront control element is a diffractive optical element, and the wavefront control element is separated from the beam deflection component. An example solution of a specific structure of the WSS may be shown in FIG. 7, and specifically includes:

an input port fiber array 701, a first demultiplexing/multiplexing grating 702, a first-stage LCoS 703, a second-stage LCoS 704, a second demultiplexing/multiplexing grating 705, an output port fiber array 706, a first wavefront control element 707, and a second wavefront control element 708. An optical path between the components is shown in FIG. 7. The input port fiber array 701, the first demultiplexing/multiplexing grating 702, the first wavefront control element 707, the first-stage LCoS 703, the second-stage LCoS 704, the second wavefront control element 708 the second demultiplexing/multiplexing grating 705, and the output port fiber array 706 are sequentially connected. It may be understood that the connection in this embodiment is not equal to physical connection, but is used to describe a transmission path of an optical signal in the components. The first wavefront control element 707 and the second wavefront control element 708 have a same structure, whose specific structure may be shown in FIG. 8. The first wavefront control element 707 and the second wavefront control element 708 are diffractive optical elements, a surface structure of the diffractive optical element is shown as 802, and N*M array elements 801 are etched on the structure shown as 802. N represents rows, configured to correspond to the N ports of the input port fiber array in the WSS, and array elements in a same row are configured to correspond to different wavelength channels of a same port. M represents columns, configured to correspond to the M wavelength channels of the input port fiber array in the WSS, and array elements in a same column are configured to correspond to different ports of a same wavelength channel. Then, wavefront control introduced by each of the N*M array elements is determined based on a phase image formed by each spot unit and deflection angle of the LCoS. Array elements in a same column of the N*M array elements have a same structure, and structures of array elements in different columns of the N*M array elements are determined based on center wavelengths of the multi-wavelength optical signals and a channel bandwidth.

Figure 8:
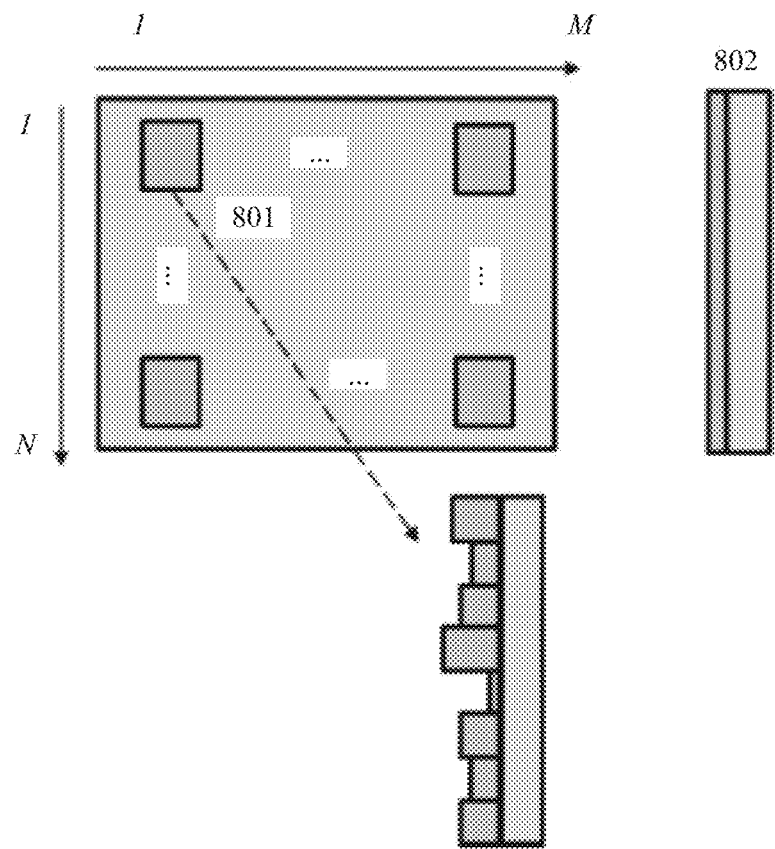
FIG. 8 is a schematic diagram of a structure of an array element of a diffractive optical element according to an embodiment of this application.

For a specific structure of the array element 801, refer to FIG. 8, A plurality of level steps of different heights are etched on a surface of the array element 801, and a width of the level step is less than a wavelength of the optical signal. In this embodiment, the height is an edge of the level step perpendicular to a bottom surface of the array element, and the width is an edge of the level step parallel to the bottom surface of the array element in a row direction (in an M direction shown in FIG. 8). Then, each array element is designed based on a deflection angle required by the optical signal, to suppress a diffraction sub-pear generated when the optical signal passes through the WSS, and cover a maximum deflection angle range required by the WSS. In this embodiment, when the diffractive optical element participates in deflection of a beam, based on a parameter of the wavefront control element calculated in a case in which a distance between the diffractive optical element and the LCoS is not enlarged, a compensation design for Fresnel diffraction in a case in which the distance is enlarged is considered. A criterion to distinguish whether the compensation is needed is whether a position of the wavefront control element is in a near field or a deep Fresnel diffraction region. If in the near field, the compensation may not be performed. If in the deep Fresnel diffraction region, the compensation design is needed. If a Fresnel number is greater than or equal to 1. it is in the near field. If it is much greater than 1, it is in the deep Fresnel diffraction region.

In this embodiment, when the level step is etched on the surface of the array element 801, an etching level of the level step (equivalent to a height of the level step) may be designed based on an actual requirement. For example, four levels of level steps (four heights of level steps) may be designed and obtained through division, corresponding to four phases, for example, 0, 2/3 pi, 4/3 pi, and 2 pi. In an actual application, more heights obtained through division indicate finer phase division, but a more difficult processing technology. Division may be performed after comprehensive consideration.

In another possible implementation solution, the wavefront control element is a super-surface optical element, and the wavefront control element and the beam deflection component LCoS are integrated into a whole. In this case, an example solution of a specific structure of the WSS may be shown in FIG. 9A, and specifically includes:

an input port fiber array 901, a first demultiplexing/multiplexing grating 902, a first-stage integrated LCoS 903, a second-stage integrated LCoS 904, a second demultiplexing/multiplexing grating 905, and an output port fiber array 906. An optical path between the components is shown in FIG, 9A, The input port fiber array 901, the first demultiplexing/multiplexing grating 902, the first-stage integrated LCoS 903, the second-stage integrated LCoS 904, the second demultiplexing/multiplexing grating 905, and the output port fiber array 906 are sequentially connected. It may be understood that the connection in this embodiment is not equal to physical connection, but is used to describe a transmission path of an optical signal in the components. The first-stage integrated LCoS 903 and the second-stage integrated LCoS 904 may have a same structure.

Figure 9A:
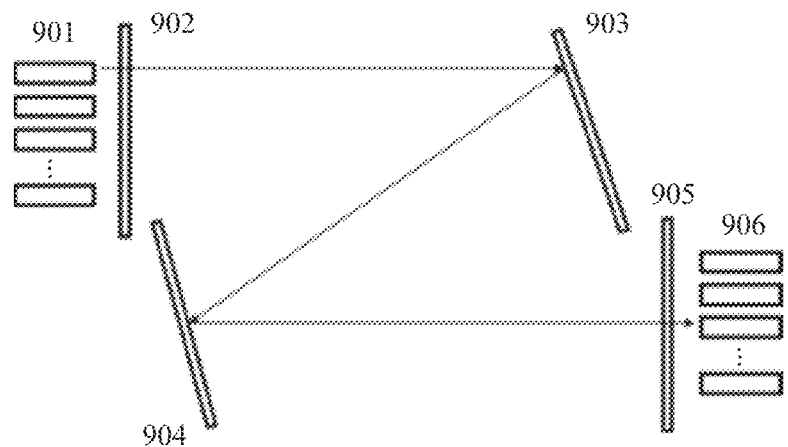
FIG. 9A is a schematic diagram of another structure of a WSS according to an embodiment of this application.
Figure 9B:
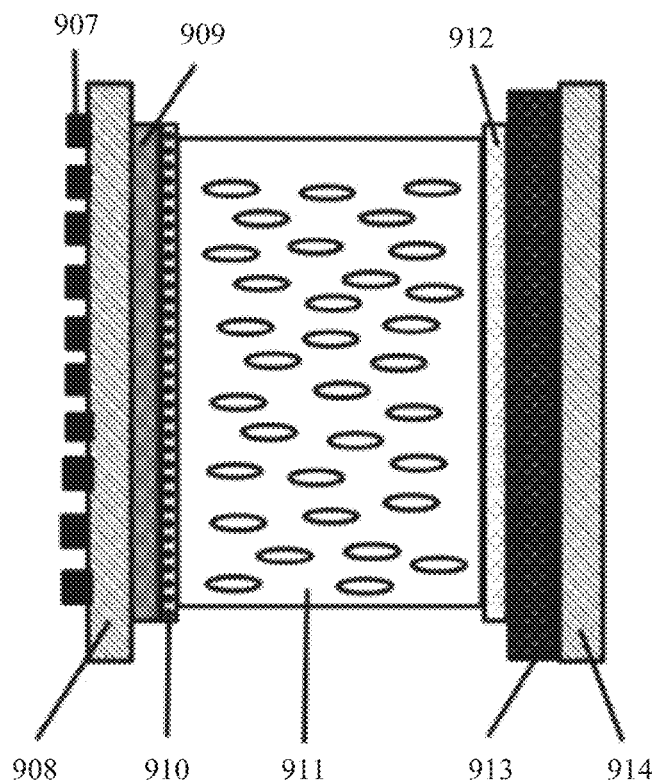
FIG. 9B is a schematic diagram of a structure of an integrated LCoS according to an embodiment of this application.

A specific structure of the first-stage integrated LCoS 903 and the second-stage integrated LCoS 904 may be shown in FIG. 9B. The integrated LCoS includes a super-surface optical element 907, a glass cover 908, a transparent electrode 909, an alignment layer 910, a liquid crystal layer 911, a reflective coating 912, a complementary metal oxide semiconductor (CMOS) substrate 913, and a printed circuit board (PCB) 914. A connection sequence between the structures is shown in FIG. 9B. The super-surface optical element 907, the glass cover 908, the transparent electrode 909, the alignment layer 910, the liquid crystal layer 911, the reflective coating 912, the CMOS substrate 913, and the PCB board 914 are sequentially connected. In this embodiment, the wavefront control element in the integrated LCoS may have the structure and function of that shown in FIG. 6, and details are not described herein again. The wavefront control element in the integrated LCoS may further include another feature, which is specifically as follows: The super-surface optical element 907 includes a plurality of nanopillars arranged based on a first preset rule. Sizes of the plurality of nanopillars may be the same or different. Widths of the plurality of nanopillars are any values, and heights are less than or equal to wavelengths of optical signals that are received by the WSS and that correspond to array elements.

Figure 10:
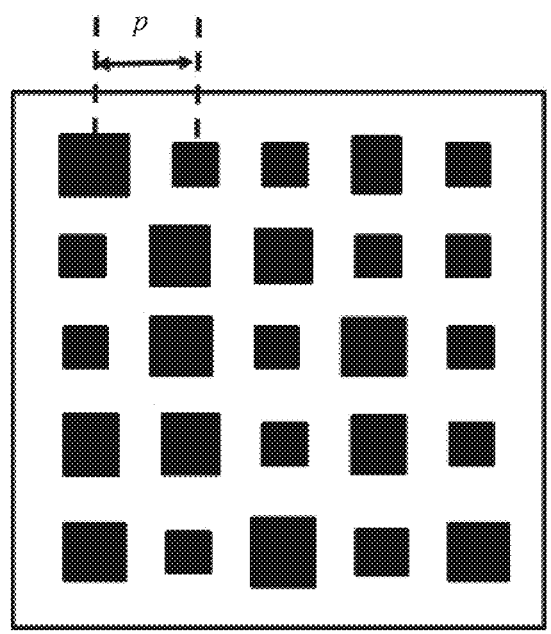
FIG. 10 is a schematic diagram of another structure of a super-surface optical element according to an embodiment of this application.
Figure 11:
FIG. 11 is a schematic top view of a super-surface optical element according to an embodiment of this application.

Specifically, the first preset rule is as follows: The plurality of nanopillars are arranged based on a first preset distance. The first preset distance is a center distance between adjacent nanopillars (as shown in FIG. 10 and FIG. 11, the center distance is set to P). The first preset distance is less than a half of the wavelength of the multi-wavelength optical signal and is equal to a divisor of a pixel width of the LCoS. That is, an integer quantity of nanopillars can be arranged within one pixel width of the LCoS. In addition, after the arrangement is completed, each X*Y nanopillars in the plurality of nanopillars correspond to one pixel of the LCoS. Both X and Y are positive integers, and X and V may be a same value or different values. This is not specifically limited herein. Herein, that each X*Y nanopillars correspond to one pixel of the LCoS is equivalent to that the X*Y nanopillars correspond to one optical signal. Specifically, a quantity of nanopillars arranged on one pixel width of the LCoS and a quantity of nanopillars arranged on one pixel length of the LCoS may be the same or different.

In another possible implementation solution, the wavefront control element is a diffractive optical element, and the wavefront control element and the beam deflection component LCoS are integrated into a whole. In this case, an example solution of a specific structure of the WSS may be shown in FIG. 9A, and specifically includes:

an input port fiber array 901, a first demultiplexing/multiplexing grating 902, a first-stage integrated LCoS 903, a second-stage integrated LCoS 904, a second demultiplexing/multiplexing grating 905, and an output port fiber array 906. An optical path between the components is shown in FIG. 9A. The input port fiber array 901, the first demultiplexing/multiplexing grating 902, the first-stage integrated LCoS 903, the second-stage integrated LCoS 904, the second demultiplexing/multiplexing grating 905, and the output port fiber array 906 are sequentially connected. It may be understood that the connection in this embodiment is not equal to physical connection, but is used to describe a transmission path of an optical signal in the components. The first-stage integrated LAMS 903 and the second-stage integrated LCoS 904 may have a same structure.

Figure 12:
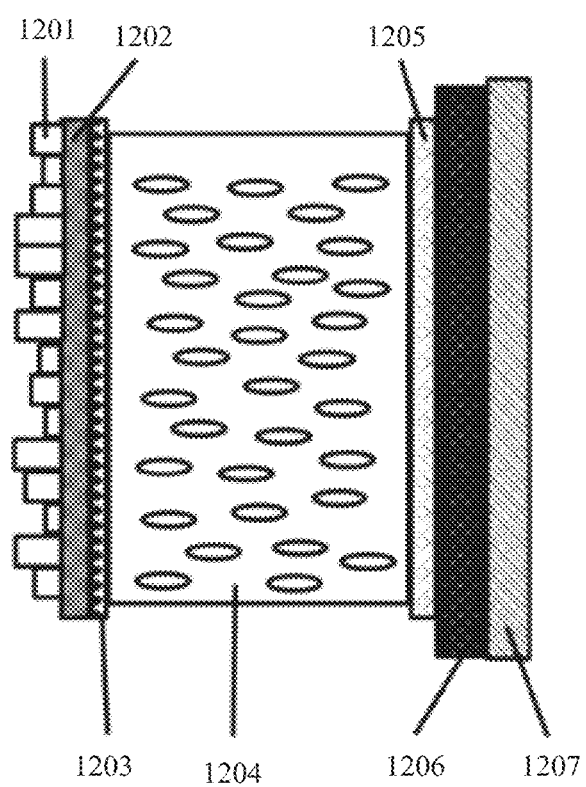
FIG. 12 is a schematic diagram of another structure of a diffractive optical element according to an embodiment of this application.

In this case, a specific structure of the first-stage integrated LCoS 903 and the second-stage integrated LCoS 904 may be shown in FIG. 12. The integrated LCoS includes a diffractive optical element 1201, a transparent electrode 1202, an alignment layer 1203, a liquid crystal layer 1204, a reflective coating 1205, a CMOS substrate 1206, and a PCB board 1207 that are sequentially connected. In this embodiment, the wavefront control element in the integrated LCoS may have the structure and function of that shown in FIG. 8, and details are not described herein again. The wavefront control element in the integrated LCoS may further include another feature, which is specifically as follows: The diffractive optical element 1201 includes a plurality of level steps of different heights arranged based on a second preset rule. Sizes of the plurality of level steps may be the same or different, and the heights of the plurality of level steps are any values. The height is an edge of the level step perpendicular to a bottom surface of the array element.

Figure 13:
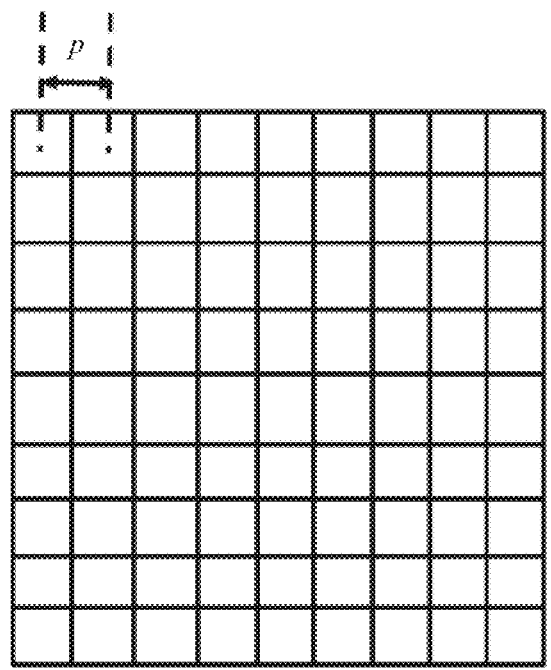
FIG. 13 is a schematic top view of a diffractive optical element according to an embodiment of this application.
Figure 14:
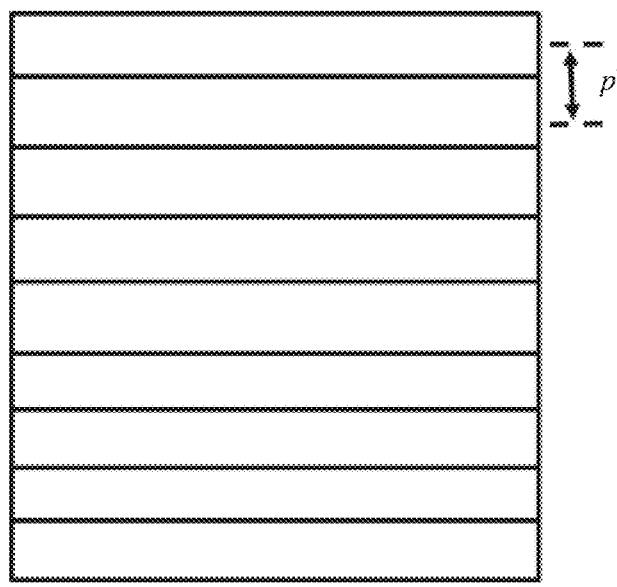
FIG. 14 is a schematic side view of a diffractive optical element according to an embodiment of this application.

Specifically, the second preset rule is as follows: The plurality of level steps are arranged based on a second preset distance. The second preset distance is a center distance between adjacent level steps (as shown in FIG. 13 and FIG. 14, the center distance is set to P). The second preset distance is less than a half of the wavelength of the multi-wavelength optical signal and is equal to a divisor of a pixel width of the LCoS. That is, an integer quantity of level steps can be arranged within one pixel width of the LCoS. In addition, after the arrangement is completed, each Q*T level steps in the plurality of level steps correspond to one pixel of the LCoS. Both Q and T are positive integers, and Q and T may be a same value or different values. This is not specifically limited herein. Herein, that each Q*T level steps correspond to one pixel of the LCoS is equivalent to that the Q*T nanopillars correspond to one optical signal. Specifically, a quantity of level steps arranged on one pixel width of the LCoS and a quantity of level steps arranged on one pixel length of the LCoS are the same or may be different.

In another possible implementation, the wavefront control element is a super-surface optical element, and the wavefront control element and the beam deflection component LCoS are integrated into a whole. In this case, an example solution of a specific structure of the WSS may be shown in FIG. 9A, and specifically includes:

an input port fiber array 901, a first demultiplexing/multiplexing grating 902, a first-stage integrated LCoS 903, a second-stage integrated LCoS 904, a second demultiplexing/multiplexing grating 905, and an output port fiber array 906. An optical path between the components is shown in FIG. 9A. The input port fiber array 901, the first demultiplexing/multiplexing grating 902, the first-stage integrated LCoS 903, the second-stage integrated LCoS 904, the second demultiplexing/multiplexing grating 905, and the output port fiber array 906 are sequentially connected. It may be understood that the connection in this embodiment is not equal to physical connection, but is used to describe a transmission path of an optical signal in the components. The first-stage integrated LCoS 903 and the second-stage integrated LCoS 904 may have a same structure.

Figure 15:
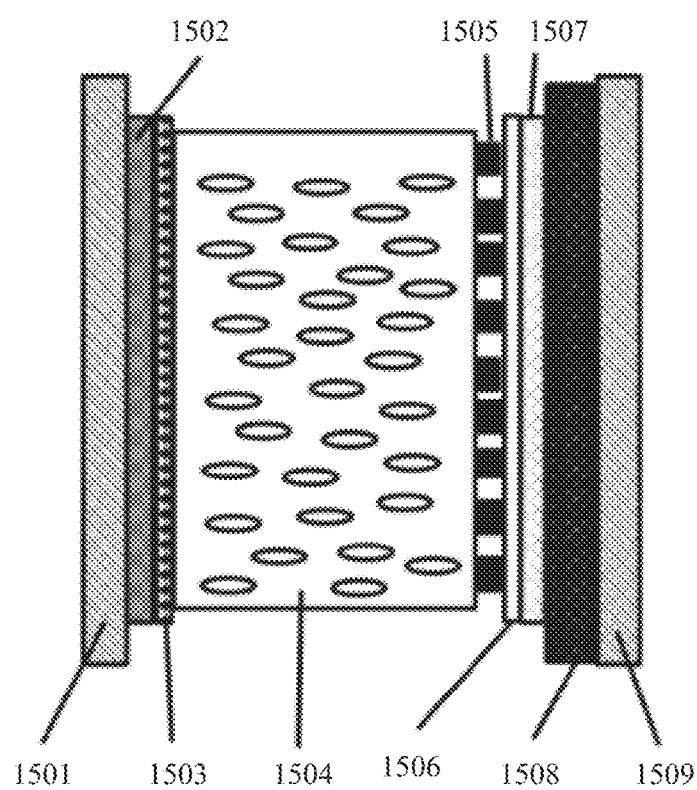
FIG. 15 is a schematic diagram of another structure of a super-surface optical element according to an embodiment of this application.

A specific structure of the first-stage integrated LCoS 903 and the second-stage integrated LCoS 904 may be shown in FIG. 15. The integrated LCoS includes a glass cover 1501, a transparent electrode 1502, an alignment layer 1503, a liquid crystal layer 1504, a super-surface optical element 1505, a spacer layer 1506, a reflective coating 1507, a CMOS substrate 1508, and a PCB board 1509. A connection sequence between the structures is shown in FIG. 15. The glass cover 1501, the transparent electrode 1502, the alignment layer 1503, the liquid crystal layer 1504, the super-surface optical element 1505, the spacer layer 1506, the reflective coating 1507, the CMOS substrate 1508, and the PCB board 1509 are sequentially connected. In this embodiment, the wavefront control element in the integrated LCoS may have the structure and function of that shown in FIG. 6, and details are not described herein again. The wavefront control element in the integrated LCoS may further include another feature, which is specifically as follows: The super-surface optical element 1505 includes a plurality of nanopillars arranged based on a first preset rule. Sizes of the plurality of nanopillars may be the same or different. Widths of the plurality of nanopillars are any values, and heights are less than or equal to wavelengths of optical signals that are received by the WSS and that correspond to array elements.

Specifically, the first preset rule is as follows: The plurality of nanopillars are arranged based on a first preset distance. The first preset distance is a center distance between adjacent nanopillars (as shown in FIG. 10 and FIG. 11, the center distance is set to P). The first preset distance is less than a half of the wavelength of the optical signal and is equal to a divisor of a pixel width of the LCoS. That is, an integer quantity of nanopillars can be arranged within one pixel width of the LCoS. In addition, after the arrangement is completed, each X*Y nanopillars in the plurality of nanopillars correspond to one pixel of the LCoS. Both X and Y are positive integers, and X and Y may be a same value or different values. This is not specifically limited herein. Herein, that each X*Y nanopillars correspond to one pixel of the LCoS is equivalent to that the X*Y nanopillars correspond to one optical signal. Specifically, a quantity of nanopillars arranged on one pixel width of the LCoS and a quantity of nanopillars arranged on one pixel length of the LCoS are the same or may be different.

In this embodiment, upon comparison between the super-surface optical element 1505 shown in FIG. 15 and the super-surface optical element 907 shown in FIG. 9B, it may be found that the super-surface optical elements are located at different positions, leading to a difference in structural design, which is specifically as follows:

In FIG. 9B, the super-surface optical element 907 is located on the glass cover 908. In FIG. 15, the super-surface optical element 1505 is located on the CMOS substrate 1508. In the former, a beam is transmitted twice through the super-surface optical element 907. The super-surface optical element 907 needs to be made of a material having high beam transmittance, such as quartz or Si, and is processed on the glass cover. A common CMOS substrate may be used. However, precise alignment needs to be ensured during packaging. In the latter, a beam is reflected once on the super-surface optical element 1505. The super-surface optical element 1505 not only may be made of a non-metallic material such as quartz or Si, but also may be made of a metal material, and is processed on the CMOS substrate. Surface processing needs to be performed on a common CMOS substrate. However, precise alignment can be achieved by using microprocessing equipment. This reduces packaging difficulty.

Different positions of the super-surface optical elements further lead to different nanopillar heights. In FIG. 9B, the super-surface optical element 907 is not in contact with the liquid crystal, and therefore may be designed to have nanopillar with a relatively large height (for example, about a wavelength) or nanopillar with a relatively small height (for example, much less than a wavelength). In FIG. 15, the super-surface optical element 1505 is in contact with or close to the liquid crystal, which affects an electric field applied to the liquid crystal, and generally can be designed to have only nanopillars with a relatively small height (for example, much less than a wavelength). In addition, it is advantageous in microprocessing to be designed to have nanopillars with a relatively small height, because microprocessing is difficult in a case of a large aspect ratio (that is, height-to-width ratio), and when the height (which may also be referred to as a depth or a thickness) is relatively small, mature film growth and etching processes can be used, and both microprocessing quality and yield are easily ensured.

Compared with the structure shown in FIG. 9B, the structure shown in FIG. 15 expands a range of materials that can be used for nanopillars, and can use more different super-surface designs. The beam is reflected only once, which can achieve a lower loss of optical energy. In addition, the design is simplified by considering only a case in which the beam passes through the super-surface optical element once.

Based on the foregoing technical solutions, a structure of each array element may vary with different application scenarios in which the WSS is located (that is, different center wavelengths of the multi-wavelength optical signals received by the WSS and channel bandwidths), which may be specifically as follows:

When the application scenario of the optical signals is facing a discrete passband, array elements in adjacent columns of the N*M array elements have different structures. For example, if N is 5 and M is 6, in the six columns of array elements, array elements in a same column have a same structure, but array elements in the first column to the sixth column have different structures.

When the application scenario of the optical signals is a wide spectrum facing FlexGrid, array elements in all columns of the N*M array elements have a same structure. For example, if N is 5 and M is 6, in the six columns of array elements, array elements in a same column have a same structure, and array elements in the first column to the sixth column have a same structure, that is, all the array elements are the same.

When the application scenario of the optical signals is an overlapped spectrum facing FlexGrid, the N*M array elements are grouped into R groups in columns, each group includes S adjacent columns, array elements in a same group have a same structure, and array elements in different groups have different structures. A product of R and S is equal to M. For example, if N is 5 and M is 6, in the six columns of array elements, array elements in a same column have a same structure, array elements in the first column and the second column have a same structure, array elements in the third column and the fourth column have a same structure, array elements in the fifth column and the sixth column have a same structure, but the structure of the array elements in the first and second columns, the structure of the array elements in the third and fourth columns, and the structure of the array elements in the fifth and sixth columns are different from each other. Array elements of a same group are applicable to a same overlapped spectrum. That is, in this embodiment, the N*M array elements are grouped in columns based on overlapped spectrums. For example, array elements applicable to a spectrum of 0 to 200 Hz are grouped into an array element group, and the array elements in the group have a same structure.

Figure 16A:
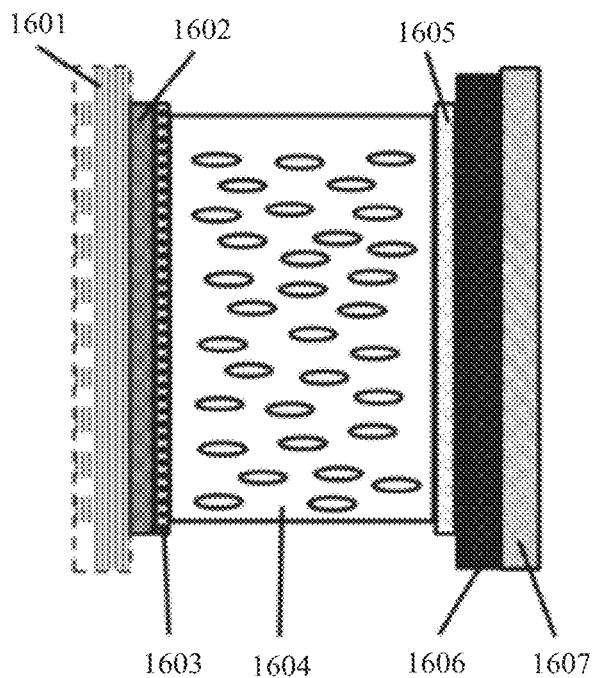
FIG. 16A is a schematic diagram of another structure of an integrated LCoS according to an embodiment of this application.

In another possible implementation solution, the wavefront control element is a super-surface optical element, and the wavefront control element and the beam deflection component LCoS are integrated into a whole. An example solution of a specific structure of the WSS may be shown in FIG. 9A. In this case, a specific structure of the first-stage integrated LCoS 903 and the second-stage integrated LCoS 904 may be shown in FIG. 16A. The integrated LCoS includes a super-surface optical element 1601 using a glass cover as a base, a transparent electrode 1602, an alignment layer 1603, a liquid crystal layer 1604, a reflective coating 1605, a complementary metal oxide semiconductor (CMOS) substrate 1606, and a printed circuit board (PCB) 1607. A connection sequence between the structures is shown in FIG. 16A. The super-surface optical element 1601 using a glass cover as a base, the transparent electrode 1602, the alignment layer 1603, the liquid crystal layer 1604, the reflective coating 1605, the CMOS substrate 1606, and the PCB board 1607 are sequentially connected. In this embodiment, the wavefront control element may have the structure and function of that shown in FIG. 6, and details are not described herein again.

In addition, the wavefront control element may further include another feature, which is specifically as follows: A surface structure of the super-surface optical element 1601 includes a plurality of nanopillars arranged based on a first preset rule. Sizes of the plurality of nanopillars may be the same or different. Widths of the plurality of nanopillars are any values, and heights are less than or equal to wavelengths of optical signals that are received by the WSS and that correspond to array elements. The super-surface optical element 1601 uses a glass cover as a base, and is obtained through processing, for example, deposition and/or etching, on the glass cover. The reflective coating 1605 is a plurality of layers of films including an alignment film and a metal reflective film, or a plurality of layers of films including an alignment film and a dielectric reflective film.

Specifically, the first preset rule is as follows: The plurality of nanopillars are arranged based on a center distance between adjacent nanopillars (as shown in FIG. 10 and FIG. 11, the center distance is se to P). The center distance between adjacent nanopillars is less than a half of the wavelength of the multi-wavelength optical signal. In a possible implementation, center distances between adjacent nanopillars are equal, and each LCoS pixel corresponds to an integer quantity of nanopillars, that is, an integer quantity of nanopillars may be arranged within one pixel width of the LCoS. In addition, after the arrangement is completed, each X*Y nanopillars in the plurality of nanopillars correspond to one pixel of the LCoS. Both X and Y are positive integers, and X and Y may be a same value or different values. This is not specifically limited herein. Herein, that each X*Y nanopillars correspond to one pixel of the LCoS is equivalent to that the X*Y nanopillars correspond to one optical signal. Specifically, a quantity of nanopillars arranged on one pixel width of the LCoS and a quantity of nanopillars arranged on one pixel length of the LCoS may be the same or different.

Figure 16B:
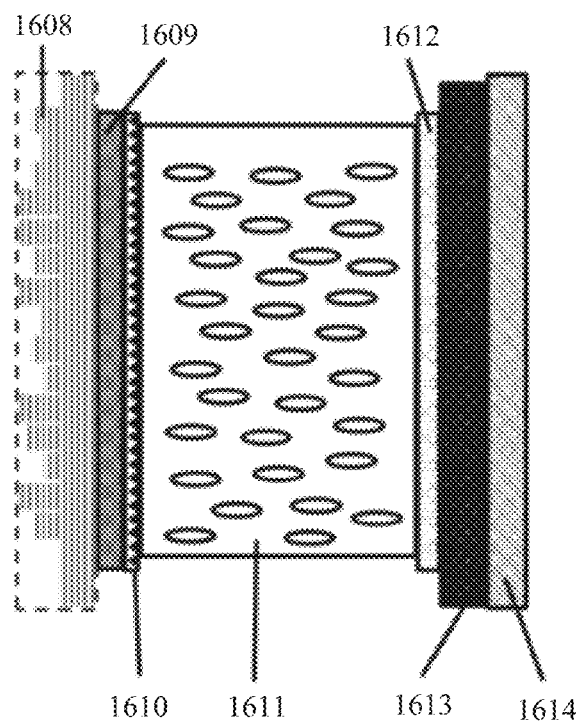
FIG. 16B is a schematic diagram of another structure of an integrated LCoS according to an embodiment of this application.

In another possible implementation solution, the wavefront control element is a diffractive optical element, and the wavefront control element and the beam deflection component LCoS are integrated into a whole. An example solution of a specific structure of the WSS may also be shown in FIG. 9A. In this case, a specific structure of the first-stage integrated LCoS 903 and the second-stage integrated LCoS 904 may be shown in FIG. 16B. The integrated LCoS includes a diffractive optical element 1608 using a glass cover as a base, a transparent electrode 1609, an alignment layer 1610, a liquid crystal layer 1611, a reflective coating 1612, a CMOS substrate 1613, and a PCB board 1614 that are sequentially connected. In this embodiment, the wavefront control element may have the structure and function of that shown in FIG. 8, and details are not described herein again.

In addition, the wavefront control element may further include another feature, which is specifically as follows: A surface structure of the diffractive optical element 1608 using a glass cover as a base includes a plurality of level steps of different heights arranged based on a second preset rule. Sizes of the plurality of level steps may be the same or different, and the heights of the plurality of level steps are any values. The height is a length of an edge of the level step perpendicular to a bottom surface of the array element. The diffractive optical element 1608 uses a glass cover as a base, and is obtained through processing, for example, deposition and/or etching, on the glass cover. The reflective coating 1612 is a plurality of layers of films including an alignment film and a metal reflective film, or a plurality of layers of films including an alignment film and a dielectric reflective film.

Specifically, the second preset rule is as follows: The plurality of level steps are arranged based on a center distance between adjacent level steps (as shown in FIG. 13 and FIG. 14, the center distance is set to P). The center distance between adjacent level steps is less than a half of the wavelength of the multi-wavelength optical signal. In a possible implementation, center distances between adjacent level steps are equal, and each LCoS pixel corresponds to an integer quantity of level steps, that is, an integer quantity of level steps may be arranged within one pixel width of the LCoS. In addition, after the arrangement is completed, each Q*T level steps in the plurality of level steps correspond to one pixel of the LCoS. Both Q and T are positive integers, and Q and T may be a same value or different values. This is not specifically limited herein. Herein, that each Q*T level steps correspond to one pixel of the LCoS is equivalent to that the Q*T nanopillars correspond to one optical signal. Specifically, a quantity of level steps arranged on one pixel width of the LCoS and a quantity of level steps arranged on one pixel length of the LCoS are the same or may be different. In a possible implementation, a phase modulation distribution corresponding to a step height distribution of the diffractive optical element is a trigonometric function, a polynomial function, or a product between a trigonometric function and a polynomial function.

Figure 17A:
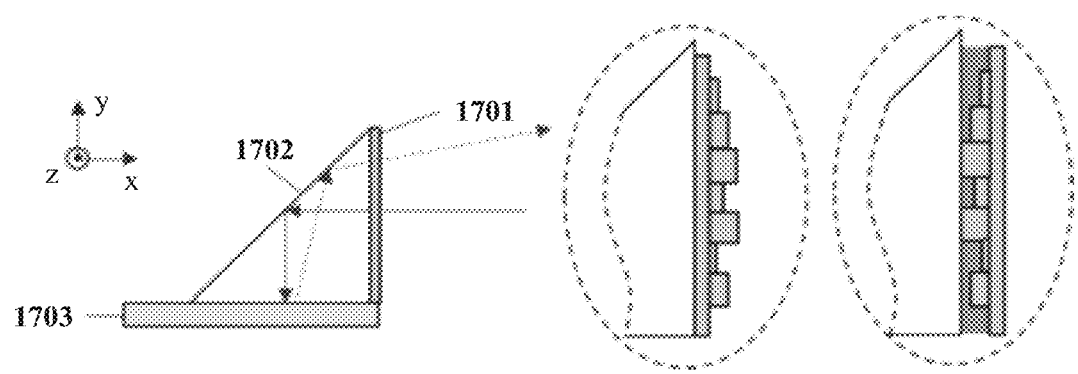
FIG. 17A is a schematic diagram of another structure of an integrated LCoS according to an embodiment of this application.

Further, a transmissive wavefront control element may be integrated with an LCoS chip by using a prism, and a specific integrated LCoS structure may be shown in FIG. 17A, The integrated. LCoS includes a wavefront control element 1701, a prism 1702, and an LCoS chip 1703. A connection sequence between the structures is shown in FIG. 17A, a beam before input to the LCoS chip has a track shown by a solid line with an arrow, and the beam after output from the LCoS chip has a track shown by a dashed line with an arrow. After modulated by the wavefront control element 1701 for the first time, the input beam enters the prism 1702, and is reflected to the LCoS chip 1703 by the prism 1702. The LCoS chip 1703 reflects the input beam, and deflects the beam around a z axis in an x-y plane and outputs the beam. The output beam enters the prism 1702, and is reflected again on an oblique boundary surface of the prism. Through the wavefront control element 1701, the beam is wavefront modulated for the second time and output. In the foregoing process, a polarization direction of the beam remains unchanged.

Figure 17B:
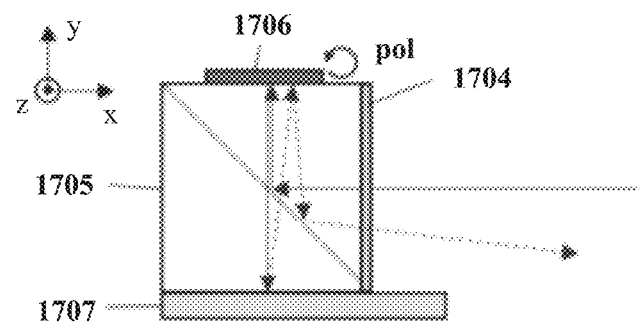
FIG. 17B is a schematic diagram of another structure of an integrated LCoS according to an embodiment of this application.

Optionally, the specific structure of the integrated LCoS may alternatively be shown in FIG. 17B. The integrated LCoS includes a wavefront control element 1704, a light splitting prism 1705, a wave plate 1706, and an LCoS chip 1707. A connection sequence of the structure is shown in FIG, 17B, a beam before input to the LCoS has a track shown by a solid line with an arrow, the beam after output from the LCoS has a track shown by a dashed line with an arrow, and an example of a polarization direction of the beam is shown by a poi mark with an arrow in FIG, 17B. The input beam is linearly polarized light. It is assumed that the polarization direction is parallel to a paper surface. Through the wavefront control element 1704, the beam is wavefront modulated for the first time and enters the light splitting prism 1705, which is reflected on an oblique boundary surface of the light splitting prism for the first time. After passing through the wave plate 1706, the beam is converted into circularly polarized light and reflected. After passing through the wave plate 1706 again, the reflected input beam is converted into linearly polarized light with a polarization direction perpendicular to the paper surface, and enters the light splitting prism 1705, which is transmitted on the oblique boundary surface of the light splitting prism for the first time, and reaches the LCoS chip 1707. The LCoS chip 1707 reflects the input beam, and deflects the beam around a z axis in an x-y plane and outputs the beam. The output beam enters the light splitting prism 1705, and is transmitted on the oblique boundary surface of the light splitting prism for the second time. After passing through the wave plate 1706, the beam is converted into circularly polarized light and reflected. After passing through the wave plate 1706 again, the reflected output beam is converted into linearly polarized light with a polarization direction parallel to the paper surface, and enters the light splitting prism 1705, which is reflected on the oblique boundary surface of the light splitting prism for the second time, Through the wavefront control element 1704, the beam is wavefront modulated for the second time and output.

Figure 17C:
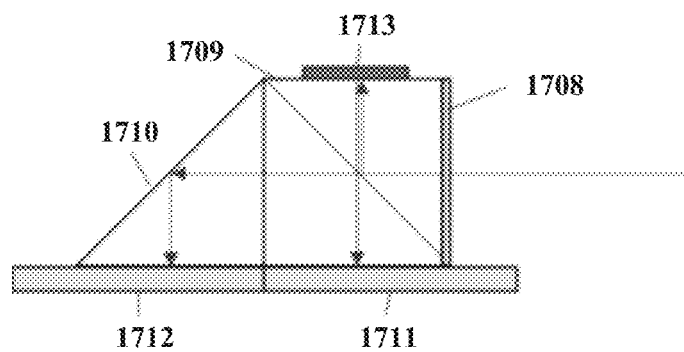
FIG. 17C is a schematic diagram of another structure of an integrated LCoS according to an embodiment of this application.

Optionally, the specific structure of the integrated LCoS may alternatively be shown in FIG. 17C. The integrated LCoS includes a wavefront control element 1708, a light splitting prism 1709, a prism 1710, a wave plate 1713, a first LCoS chip 1711, and a second LCoS chip 1712. A connection sequence of the structure is shown in FIG, 17C, and a beam before input to the LCoS has a track shown by a solid line with an arrow The input beam is polarized multiplexed light and includes two polarization directions orthogonal to each other. Through the wavefront control element 1708, the beam is wavefront modulated for the first time, and enters the light splitting prism 1709, Which is polarized and split on an oblique boundary surface of the light splitting prism to obtain two beams of linearly polarized light with perpendicular polarization directions. One beam of linearly polarized light is reflected to the wave plate 1713, converted into linearly polarized light with a polarization direction rotated 90 degrees and reflected to the light splitting prism 1709, and transmitted to the first LCoS chip 1711, which is reflected and deflected, transmitted to the wavefront control element 1708 in a deflection direction for a second wavefront modulation, and output. The other beam of linearly polarized light is transmitted to the prism 1710, and reflected to the second LCoS chip 1712 by the prism 1710, which is reflected and deflected, transmitted to the wavefront control element 1708 in a deflection direction for a second modulation, and output.

Figure 17D:
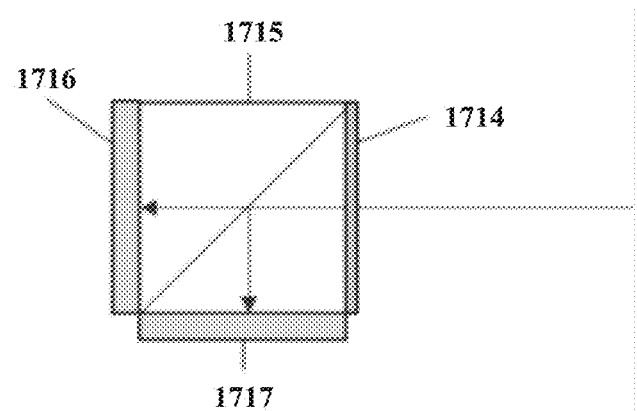
FIG. 17D is a schematic diagram of another structure of an integrated LCoS according to an embodiment of this application.

Optionally, the specific structure of the integrated LCoS may alternatively be shown in FIG. 17D. The integrated LCoS includes a wavefront control element 1714, a light splitting prism 1715, a first LCoS chip 1716, and a second LCoS chip 1717. The first LCoS chip 1716 and the second LCoS chip 1717 are connected to two optical planes of the light splitting prism 1715. In this case, a beam before input to the LCoS has a track shown by a solid line with an arrow. The input beam is also polarized multiplexed light and includes two polarization directions orthogonal to each other. Through the wavefront control element 1714, the beam is wavefront modulated for the first time, and enters the light splitting prism 1715, which is polarized and split on an oblique boundary surface of the light splitting prism to obtain two beams of linearly polarized light with perpendicular polarization directions. One beam of linearly polarized light is reflected to the second LCoS chip 1717, which is reflected and deflected, transmitted to the wavefront control element 1714 in a deflection direction for a second modulation, and output, The other beam of linearly polarized light is transmitted to the first LCoS chip 1716, which is reflected and deflected, transmitted to the wavefront control element 1714 in a deflection direction for a second modulation, and output.

Figure 17E:
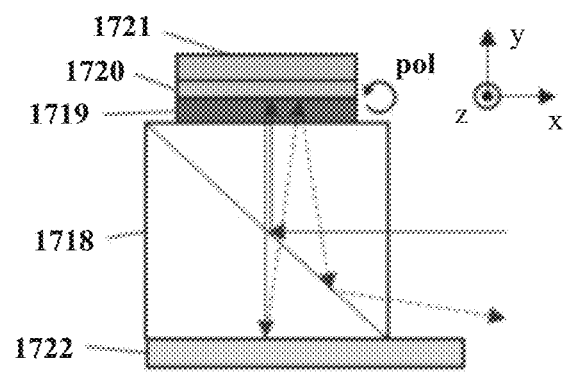
FIG. 17E is a schematic diagram of another structure of an integrated LCoS according to an embodiment of this application.

Optionally, the specific structure of the integrated LCoS may alternatively be shown in FIG. 17E. The integrated. LCoS includes a light splitting prism 1718, a wave plate 1719, a wavefront control element 1720, a reflector 1721, and an LCoS chip 1722. A connection relationship between the components is shown in FIG. 17E, a beam before input to the LCoS has a track shown by a solid line with an arrow, the beam after output from the LCoS has a track shown by a dashed line with an arrow, and an example of a polarization direction of the beam is shown by a pol mark with an arrow in FIG. 17E. The input beam is linearly polarized light. It is assumed that the polarization direction is parallel to a paper surface. The beam enters the light splitting prism 1718, and is reflected on an oblique boundary surface of the light splitting prism for the first time. After passing through the wave plate 1719, the beam is converted into circularly polarized light. Then through the wavefront control element 1720, the beam is wavefront modulated for the first time, which reaches the reflector 1721 and is reflected, The reflected beam passes through the wavefront control element 1720 again, and the beam is wavefront modulated for the second time. After passing through the wave plate 1719 again, the beam is converted into linearly polarized. light with a polarization direction perpendicular to the paper surface, and enters the light splitting prism 1718, which is transmitted on the oblique boundary surface of the light splitting prism for the first time, and reaches the LCoS chip 1722. The LCoS chip 1722 reflects the input beam, and deflects the beam around a z axis in an x-y plane and outputs the beam. The output beam enters the light splitting prism 1718, and is transmitted on the oblique boundary surface of the light splitting prism for the second time. After passing through the wave plate 1719, the beam is converted into circularly polarized light. Then through the wavefront control element 1720, the beam is wavefront modulated for the third time, which reaches the reflector 1721 and is reflected. The reflected beam passes through the wavefront control element 1720 again, and the beam is wavefront modulated for the fourth time. After passing through the wave plate 1719, the beam is converted into linearly polarized light with a polarization direction parallel to the paper surface, and enters the light splitting prism 1718, which is reflected on the oblique boundary surface of the light splitting prism for the second time and output.

The wavefront control element in FIG. 17A to FIG. 17E may be connected to another structure such as the prism, the light splitting prism, the wave plate, or the reflector based on a base, or connected to another structure such as the prism, the light splitting prism, the wave plate, or the reflector based on a surface structure. In an example, the base of the wavefront control element is connected to the prism, as shown in a middle diagram of FIG. 17A, or the surface structure of the wavefront control element is connected to the prism, as shown in a right diagram of FIG. 17A. If the surface structure is connected to the prism, a gap between the surface structure and the prism may be filled with air, a special gas, a refractive index matched liquid, a cured polymer medium, or the like. The LCoS chip includes a glass cover, a transparent electrode, an alignment layer, a liquid crystal layer, a reflective coating, a CMOS substrate, and a PCB board that are sequentially connected. In the foregoing embodiment, the wavefront control element in the integrated LCoS may have the structure and function of that shown in FIG. 6 or FIG. 8, and details are not described herein again. It should be understood that the LCoS chip may deflect the input beam to any direction. The foregoing embodiment is merely an example.

Figure 18A:
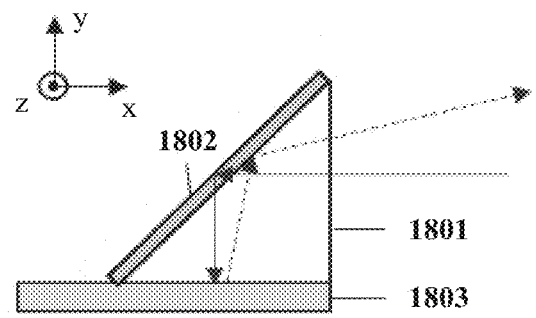
FIG. 18A is a schematic diagram of another structure of an integrated LCoS according to an embodiment of this application.

In addition, if the wavefront control element is a reflective, a specific structure of an integrated LCoS formed by integrating the wavefront control element and an LCoS chip may have various forms. A possible structure is shown in FIG. 18A. The integrated LCoS includes a prism 1801, a wavefront control element 1802, and an LCoS chip 1803. A connection relationship between the components is shown in FIG. 18A, a beam before input to the LCoS has a track shown by a solid line with an arrow, and the beam after output from the LAMS has a track shown by a dashed line with an arrow. The input beam enters the prism 1801, and through the wavefront control element 1802, the beam is wavefront modulated for the first time, and reflected on the wavefront control element for the first time, which passes through the prism 1801 again, and reaches the LCoS chip 1803. The LCoS chip 1803 reflects the input beam, and deflects the beam around a z axis in an x-y plane and outputs the beam. The output beam enters the prism 1801, and through the wavefront control element 1802, the beam is wavefront modulated for the second time, and reflected on the wavefront control element for the second time, which enters the prism 1801 again, and is output. In the foregoing process, a polarization direction of the beam remains unchanged.

Figure 18B:
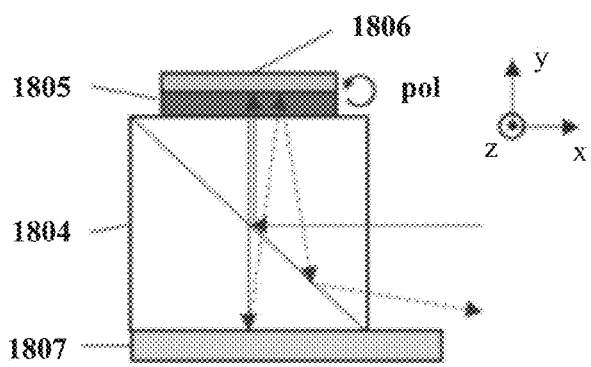
FIG. 18B is a schematic diagram of another structure of an integrated LCoS according to an embodiment of this application.

Optionally, the specific structure of the integrated LCoS may alternatively be shown in FIG. 18B. The integrated LCoS includes a light splitting prism 1804, a wave plate 1805, a wavefront control element 1806, and an LCoS chip 1807. A connection sequence between the components is shown in FIG. 18B, a beam before input to the LCoS has a track shown by a solid line with an arrow, the beam after output from the LCoS has a track shown by a dashed line with an arrow, and an example of a polarization direction of the beam is shown by a pol mark with an arrow in FIG. 18B. The input beam is linearly polarized light. It is assumed that the polarization direction is parallel to a paper surface. The beam enters the light splitting prism 1804, and is reflected on an oblique boundary surface of the light splitting prism for the first time. After passing through the wave plate 1805, the beam is converted into circularly polarized light and incident into the wavefront control element 1806. After the circularly polarized light is wavefront modulated by the wavefront control element 1806, the output beam passes through the wave plate 1805 again and then is converted into linearly polarized light with a polarization direction perpendicular to the paper surface, and enters the light splitting prism 1804, which is transmitted on the oblique boundary surface of the light splitting prism for the first time, and reaches the LCoS chip 1807. The LCoS chip 1807 reflects the input beam, and deflects the beam around a z axis in an x-y plane and outputs the beam. The output beam enters the light splitting prism 1804, and is transmitted on the oblique boundary surface of the light splitting prism for the second time. After passing through the wave plate 1805, the beam is converted into circularly polarized light and incident into the wavefront control element 1806 again, and the beam is wavefront modulated for the second time and output. After passing through the wave plate 1805 again, the output beam is converted into linearly polarized light with a polarization direction parallel to the paper surface, and enters the light splitting prism 1804, which is reflected on the oblique boundary surface of the light splitting prism for the second time and finally output.

Figure 18C:
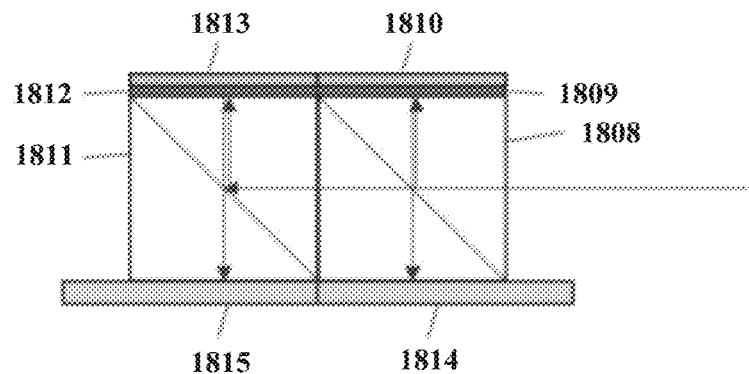
FIG. 18C is a schematic diagram of another structure of an integrated LCoS according to an embodiment of this application.

The specific structure of the integrated LCOS may alternatively be shown in FIG. 18C. The integrated LCoS includes a first light splitting prism 1808, a first wave plate 1809, a first wavefront control element 1810, a second light splitting prism 1811, a second wave plate 1812, a second wavefront control element 1813, a first LCOS chip 1814, and a second LCOS chip 1815. A connection sequence of the structure is shown in FIG. 18C, and a beam before input to the LCOS has a track shown by a solid line with an arrow. The input beam is polarized multiplexed light and includes two polarization directions orthogonal to each other. The input beam enters the first light splitting prism 1808, and is polarized and split on an oblique boundary surface of the light splitting prism to obtain two beams of linearly polarized light with perpendicular polarization directions. One beam of linearly polarized light is reflected to the first wave plate 1809, and converted into circularly polarized light and incident into the first wavefront control element 1810. After the circularly polarized light is wavefront modulated by the first wavefront control element 1810, the output beam passes through the first wave plate 1809 again and then is converted into linearly polarized light with a polarization direction perpendicular to the polarization direction when the beam passes through the first wave plate 1809 at the first time. The beam enters the first light splitting prism 1808, and is transmitted to the first LCOS chip 1814, which is reflected and deflected, transmitted to the first wavefront control element 1810 in a deflection direction for a second modulation, and then transmitted to the first light splitting prism 1808 and output. The other beam of linearly polarized light is transmitted to the second light splitting prism 1811, then reflected to the second wave plate 1812, and converted to circularly polarized light and incident into the second wavefront control element 1813. After the circularly polarized light is wavefront modulated by the second wavefront control element 1813, the output beam passes through the second wave plate 1812 again and then is converted into linearly polarized light with a polarization direction perpendicular to the polarization direction when the beam passes through the second wave plate 1812 at the first time. The beam enters the second light splitting prism 1811, and is transmitted to the second LCOS chip 1815, which is reflected and deflected, transmitted to the second wavefront control element 1813 in a deflection direction for a second modulation, and then transmitted to the first light splitting prism 1808 and output.

Figure 18D:
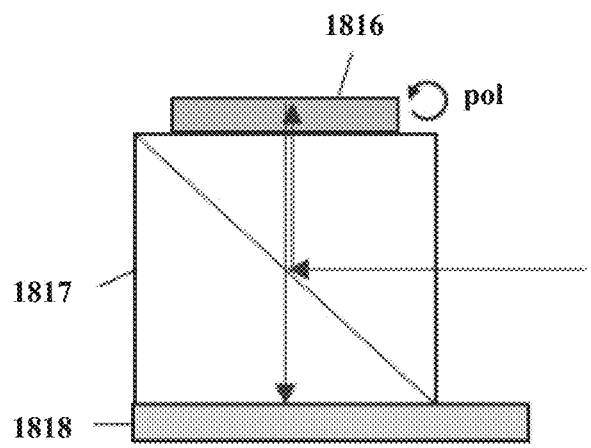
FIG. 18D is a schematic diagram of another structure of an integrated LCoS according to an embodiment of this application.

The specific structure of the integrated LCOS may alternatively be shown in FIG. 18D. The integrated LAMS includes a wavefront control element 1816, a light splitting prism 1817, and LCoS chip 1818. A connection sequence between the components is shown in FIG. 18D, a beam before input to the LCoS has a track shown by a solid line with an arrow, the beam after output from the LCoS has a track shown by a dashed line with an arrow, and an example of a polarization direction of the beam is shown by a pol mark with an arrow in FIG. 18D. The input beam is linearly polarized light. It is assumed that the polarization direction is parallel to a paper surface. The beam enters the light splitting prism 1817, and is reflected on an oblique boundary surface of the light splitting prism for the first time, which reaches the wavefront control element 1816 for wavefront modulation, and the output beam is rotated 90 degrees relative to the polarization direction of the incident beam. The reflected output beam enters the light splitting prism 1817, and is transmitted on the oblique boundary surface of the light splitting prism for the first time, which reaches the LCoS chip 1818. It should be noted that a base or-and a wavefront control structure of the wavefront control element 1816 is made of a crystal material having a polarization rotation function, or the wavefront control structure of the wavefront control element has a polarization rotation function. This is not limited in this application.

In the embodiments shown in FIG. 18A to FIG. 18D, the wavefront control element in the integrated LCoS is reflective. The wavefront control element may be connected to another structure such as the prism, the light splitting prism, the wave plate, or the reflector based on the base, or connected to another structure such as the prism, the light splitting prism, the wave plate, or the reflector based on a surface structure. For example, as shown in FIG. 18A. Where the surface structure is connected, a gap between the surface structure and the prism may be filled with air, a special gas, a refractive index matched liquid, a cured polymer medium, or the like. The LCoS chip includes a glass cover, a transparent electrode, an alignment layer, a liquid crystal layer, a reflective coating, a CMOS substrate, and a PCB board that are sequentially connected. The wavefront control structure of the LCoS may have the structure and function of that shown in FIG. 6 or FIG. 8, and details are not described herein again. It should be understood that the LCoS chip may deflect the input beam to any direction. The foregoing embodiment is merely an example.

It may be understood that, in embodiments of this application, different technical solutions of the wavefront control element may be used alone or may be used in combination. For example, a wavefront control element in one WSS may include both the super-surface optical element and the diffractive optical element, or only the super-surface optical element or the diffractive optical element, or both the LCoS integrated with the super-surface optical element and the LCoS integrated with the diffractive optical element, or only the LCoS integrated with the super-surface optical element or the LCoS integrated with the diffractive optical element. A specific situation is not limited herein, provided that the wavefront control element and the LCoS can jointly modulate the optical signals transmitted through the M wavelength channels, so that the WSS suppresses the diffraction sub-peaks of the optical signals transmitted through the M wavelength channels, thereby improving isolation and greatly reducing crosstalk of the WSS.

It may be clearly understood by a person skilled in the art that, for purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed systems, apparatuses, and methods may be implemented in other manners. For example, the described apparatus embodiments are merely examples. For example, division into units is merely logical function division and may be other division during an actual implementation. For example, a plurality of units or components may be combined or integrated into another system, or some features may be ignored or not performed. In addition, the displayed or discussed mutual coupling or direct coupling or communication connections may be implemented through some interfaces. The indirect coupling or communication connections between the apparatuses or units may be implemented in electronic, mechanical, or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of the embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this application. The storage medium includes any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A wavelength selective switch (WSS), comprising:
an input port fiber array, a demultiplexing/multiplexing grating group, an output port fiber array, and a beam deflection component group, wherein the beam deflection component group comprises two beam deflection components and at least one wavefront control element, the at least one wavefront control element comprises N*M elements of an array, and at least one beam deflection component is a liquid crystal on silicon (LCoS);
the at least one wavefront control element is located on an optical path between the demultiplexing/multiplexing grating group and the beam deflection component group, or the at least one wavefront control element and the LCOS are integrated into an integrated LCOS;
the input port fiber array comprises N ports, and the N ports receive multi-wavelength optical signals;
the demultiplexing/multiplexing grating group demultiplexes the multi-wavelength optical signals received from the N ports to N*M wavelength channels for transmission, wherein both N and M are positive integers;
the beam deflection component group deflects, to the demultiplexing/multiplexing grating group, optical signals transmitted through the N*M wavelength channels;
the demultiplexing/multiplexing grating group multiplexes, to the output port fiber array, the optical signals transmitted through the N*M wavelength channels; and
the at least one wavefront control element and the LCOS jointly modulate the optical signals transmitted through the N*M wavelength channels, wherein the WSS suppresses diffraction sub-peaks generated when the optical signals transmitted through the N*M wavelength channels pass through the LCoS.

2. The WSS according to claim 1, wherein the N*M elements of the array are in a one-to-one correspondence with the N*M wavelength channels;
wavefront control introduced by each of the N*M elements of the array is determined based on a phase image formed by each spot unit and deflection angle of the LCOS; and
each of the N*M elements of the array modulates a corresponding optical signal in N*M optical signals received by the input port fiber array, wherein the WSS suppresses a diffraction sub-peak generated when the corresponding optical signal passes through the LCoS.

3. The WSS according to claim 2, wherein N elements of the array that are in the N*M elements of the array and that respectively correspond to wavelength channels of a same wavelength have a same structure.

4. The WSS according to claim 2, wherein the at least one wavefront control element is a super-surface optical element or a diffractive optical element.

5. The WSS according to claim 4, wherein when the at least one wavefront control element is the super-surface optical element;
each of the N*M elements of the array comprises a plurality of nanopillars, a width of each nanopillar is less than or equal to a wavelength of an optical signal corresponding to the element of the array, and a height of each nanopillar is less than or equal to the wavelength of the optical signal corresponding to the element of the array;
the plurality of nanopillars are grouped and arranged in columns; and
a width occupied by each column of nanopillars is d, arrangement positions of nanopillars between adjacent columns are the same, and d is greater than or equal to a width of a nanopillar with a maximum size in the nanopillars and less than or equal to a pixel width of the LCoS.

6. The WSS according to claim 4, wherein;
each of the N*M elements of the array comprises a plurality of nanopillars, and the plurality of nanopillars are grouped and arranged in columns; and
a center distance between adjacent nanopillars in each column of nanopillars is less than a half of the wavelength of the optical signal corresponding to the element of the array.

7. The WSS according to claim 5, wherein when the at least one wavefront control element and the LCOS are integrated into the integrated LCOS:
the integrated LCoS comprises the super-surface optical element, a transparent electrode, an alignment layer, a liquid crystal layer, a reflective coating, a complementary metal oxide semiconductor (CMOS) substrate, and a printed circuit board (PCB) that are sequentially connected; or the integrated LCoS comprises a glass cover, a transparent electrode, an alignment layer, a liquid crystal layer, the super-surface optical element, a spacer layer, a reflective coating, a complementary metal oxide semiconductor (CMOS) substrate, and a printed circuit board (PCB) that are sequentially connected.

8. The WSS according to claim 4, wherein when the at least one wavefront control element is a diffractive optical element, each of the N*M elements of the array comprises a plurality of level steps of different heights, and a width of the level step is less than a wavelength of the optical signal corresponding to the element of the array.

9. The WSS according to claim 8, wherein
a center distance between adjacent level steps in each column of level steps is less than a half of the wavelength of the optical signal corresponding to the element of the array.

10. The WSS according to claim 9, wherein the integrated LCOS comprises the diffractive optical element, a transparent electrode, an alignment layer, a liquid crystal layer, a reflective coating, a complementary metal oxide semiconductor (CMOS) substrate, and a printed circuit board (PCB) that are sequentially connected.

11. The WSS according to claim 2, wherein;
when an application scenario of the optical signals is facing a discrete passband, elements of the array that are in the N*M elements of the array and that correspond to wavelength channels of different wavelengths have different structures;
when the application scenario of the optical signals is a wide spectrum facing FlexGrid, elements of the array in all columns of the N*M elements of the array have a same structure; and
when the application scenario of the optical signals is an overlapped spectrum facing FlexGrid, the N*M elements of the array are grouped into R groups in columns, each group comprises S adjacent columns, elements of the array in a same group have a same structure, elements of the array in different groups have different structures, a product of R and S is equal to M, and each column of elements of the array corresponds to wavelength channels of a same wavelength that are of different ports.

12. A wavefront control element, applied to a wavelength selective switch (WSS), wherein the WSS comprises at least one liquid crystal on silicon (LCoS), and the wavefront control element comprises:

N*M elements of an array, wherein the N*M elements of the array are in a one-to-one correspondence with the N*M wavelength channels, and both N and M are positive integers;
wavefront control introduced by each of the N*M elements of the array is determined based on a phase image formed by each spot unit and deflection angle of the LCOS; and
each of the N*M array elements of the array modulates a corresponding optical signal in N*M optical signals received by an input port fiber array, wherein the WSS suppresses a diffraction sub-peak generated when the corresponding optical signal passes through the LCoS.

13. The wavefront control element according to claim 12, wherein elements of the array that are in the N*M elements of the array and that respectively correspond to wavelength channels of a same wavelength have a same structure.

14. The wavefront control element according to claim 12, wherein the wavefront control element is a super-surface optical element or a diffractive optical element.

15. The wavefront control element according to claim 14, wherein the wavefront control element is the super-surface optical element, each of the N*M elements of the array comprises a plurality of nanopillars, a width of each nanopillar is less than or equal to a wavelength of the corresponding optical signal, and a height of the nanopillar is less than or equal to the wavelength of the corresponding optical signal;
the plurality of nanopillars are grouped and arranged in columns; and
a width occupied by each column of nanopillars is d, arrangement positions of nanopillars between adjacent columns are the same, and d is greater than or equal to a width of a nanopillar with a maximum size in the nanopillars and less than or equal to a pixel width of the LCoS.

16. The wavefront control element according to claim 14, wherein the wavefront control element is the diffractive optical element, each of the N*M elements of the array comprises a plurality of level steps of different heights, and a width of each level step is less than a wavelength of an optical signal corresponding to the element of the array.

* * * * *

UNITED STATES PATENT AND TRADEMARK OFFICE
CERTIFICATE OF CORRECTION

| | | |
|---|---|---|
| PATENT NO. | : 12,088,973 B2 | Page 1 of 1 |
| APPLICATION NO. | : 17/870014 | |
| DATED | : September 10, 2024 | |
| INVENTOR(S) | : Tenghao Li, Yong Wang and Hui Xiang | |

It is certified that error appears in the above-identified patent and that said Letters Patent is hereby corrected as shown below:

In the Claims

In Column 31, In Line 60, In Claim 1, delete "LCOS" and insert -- LCoS --.

In Column 31, In Line 60, In Claim 1, delete "LCOS;" and insert -- LCoS; --.

In Column 32, In Line 8, In Claim 1, delete "LCOS" and insert -- LCoS --.

In Column 32, In Line 20, In Claim 2, delete "LCOS;" and insert -- LCoS; --.

In Column 32, In Line 35, In Claim 5, delete "element;" and insert -- element: --.

In Column 32, In Line 51, In Claim 6, delete "wherein;" and insert -- wherein: --.

In Column 32, In Line 60, In Claim 7, delete "LCOS" and insert -- LCoS --.

In Column 32, In Line 61, In Claim 7, delete "LCOS:" and insert -- LCoS: --.

In Column 33, In Line 18, In Claim 10, delete "LCOS" and insert -- LCoS --.

In Column 33, In Line 23, In Claim 11, delete "wherein;" and insert -- wherein: --.

In Column 34, In Line 8, In Claim 12, delete "LCOS;" and insert -- LCoS; --.

In Column 34, In Line 9, In Claim 12, after "N*M" delete "array".

Signed and Sealed this
Thirty-first Day of December, 2024

Derrick Brent
*Acting Director of the United States Patent and Trademark Office*